United States Patent
Low et al.

(10) Patent No.: US 11,640,549 B2
(45) Date of Patent: May 2, 2023

(54) VARIATIONAL QUANTUM GIBBS STATE PREPARATION

(71) Applicant: Microsoft Technology Licensing, LLC, Redmond, WA (US)

(72) Inventors: Guang Hao Low, Redmond, WA (US); Nathan O. Wiebe, Seattle, WA (US); Anirban Ch Narayan Chowdhury, Albuquerque, NM (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 948 days.

(21) Appl. No.: 16/399,251

(22) Filed: Apr. 30, 2019

(65) Prior Publication Data

US 2020/0349457 A1    Nov. 5, 2020

(51) Int. Cl.
  *G06N 10/00*  (2022.01)
  *G06F 17/14*  (2006.01)
  *G06F 17/16*  (2006.01)
  *G06N 10/60*  (2022.01)

(52) U.S. Cl.
  CPC ............ *G06N 10/00* (2019.01); *G06F 17/14* (2013.01); *G06F 17/16* (2013.01); *G06N 10/60* (2022.01)

(58) Field of Classification Search
  CPC ...... G06N 10/00; G06N 20/00; G06N 3/0445; G06N 5/003; G06N 3/0472; G06N 3/08; G06N 7/005; G06N 10/60; G06F 17/14; G06F 17/16; G06F 17/18; G06F 30/20; B82Y 10/00
  See application file for complete search history.

(56) References Cited

U.S. PATENT DOCUMENTS

| | | | |
|---|---|---|---|
| 2003/0005010 A1* | 1/2003 | Cleve | B82Y 10/00 708/403 |
| 2017/0264373 A1* | 9/2017 | Krovi | G06N 10/00 |
| 2017/0364796 A1 | 12/2017 | Wiebe et al. | |
| 2018/0165601 A1 | 6/2018 | Wiebe et al. | |

(Continued)

OTHER PUBLICATIONS

Romero, Jonathan, et al. "Strategies for quantum computing molecular energies using the unitary coupled cluster ansatz." Quantum Science and Technology 4.1 (2018): 014008 (Year: 2018).*

(Continued)

*Primary Examiner* — Yoshihisa Ishizuka
*Assistant Examiner* — Carter W Ferrell
(74) *Attorney, Agent, or Firm* — Alleman Hall Creasman & Tuttle LLP

(57) ABSTRACT

Methods for preparing a Gibbs state in a qubit register of a quantum computer include applying one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state. The methods further include evaluating the Gibbs free energy of the trial quantum state, adjusting the parameters $\vec{\theta}$, re-applying the one or more quantum gates to the one or more qubits to refine the trial quantum state according to the parameters $\vec{\theta}$ as adjusted, and re-evaluating the Gibbs free energy of the trial quantum state.

18 Claims, 10 Drawing Sheets

(56) References Cited

U.S. PATENT DOCUMENTS

| | | | | |
|---|---|---|---|---|
| 2019/0197426 A1* | 6/2019 | Kawano | .................. | G06F 15/16 |
| 2021/0174236 A1* | 6/2021 | Babbush | ................. | G06N 10/20 |
| 2021/0279631 A1* | 9/2021 | Pichler | ................... | G06N 10/00 |

OTHER PUBLICATIONS

Lloyd, Seth, Masoud Mohseni, and Patrick Rebentrost. "Quantum principal component analysis." Nature Physics 10.9 (2014): 631-633 (Year: 2014).*

Silver, R. N. "Quantum entropy regularization." Maximum Entropy and Bayesian Methods Garching, Germany 1998. Springer, Dordrecht, 1999. 91-98 (Year: 1999).*

Apeldoorn, et al., "Quantum sdp-solvers: Better upper and lower bounds", In Proceedings of 58th IEEE Annual Symposium on Foundations of Computer Science, Oct. 15, 2017, pp. 403-414.

Boyd, et al., "Convex Optimization", In Proceedings of Cambridge University Press, Mar. 8, 2004, 730 Pages uploaded in five parts.

Brassard, et al., "Quantum amplitude amplification and estimation", In Journal of Contemporary Mathematics, vol. 305, May 2, 2000, pp. 1-22.

Graham, et al., "From the Discrete to the Continuous", In Book of Concrete Mathematics: A Foundation for Computer Science, 1989, pp. 106-107.

Knill, et al., "Optimal Quantum Measurements of Expectation Values of Observables", In Journal of Physical Review A, 75(1), Jan. 24, 2007, 22 Pages.

Low, et al., "Hamiltonian simulation by qubitization", In Publication of arXiv preprint arXiv:1610.06546, Oct. 20, 2016, pp. 1-20.

Preskill, John, "Quantum Computing in the NISQ era and beyond", In Journal of Quantum, vol. 2, Issue 79, Aug. 6, 2018, 20 Pages.

Yung, et al., "A quantum-quantum metropolis algorithm", In Proceedings of the National Academy of Sciences, 109(3), Jan. 17, 2012, pp. 754-759.

Amin, et al., "Quantum Boltzmann Machine", Retrieved from <<https://arxiv.org/pdf/1601.02036.pdf>>, May 23, 2018, 11 Pages.

Apeldoorn, et al., "Quantum sdp-solvers: Better upper and lower bounds", In Proceedings of 58th IEEE Annual Symposium on Foundations of Computer Science, Oct. 15, 2017, pp. 1-74.

Brassard, et al., "Quantum amplitude amplification and estimation", In Journal of Contemporary Mathematics, vol. 305, May 2, 2000, pp. 1-32.

Chowdhury, et al., "Quantum algorithms for Gibbs sampling and hitting-time estimation", In Journal of Quantum Information & Computation, vol. 17, Issue 1-2, Feb. 2017, pp. 1-13.

Gilyen, et al., "Quantum singular value transformation and beyond: exponential improvements for quantum matrix arithmetics", In Proceedings of Computing Research Repository, Jun. 2018, 67 Pages.

Haber, et al., "Notes on the matrix exponential and logarithm", Retrieved from <<http://scipp.ucsc.edu/~haber/webpage/MatrixExpLog.pdf>>, Feb. 11, 2018, pp. 1-20.

Higham, Nicholas J., "Functions of matrices: theory and computation", In Publication of Society for Industrial and Applied Mathematics, vol. 104, Sep. 11, 2008, 27 Pages.

Kimmel, et al., "Hamiltonian simulation with optimal sample complexity", In Journal of npj Quantum Information, vol. 3, Issue 1, Mar. 30, 2017, 29 Pages.

Landau, et al., "Statistical physics, vol. 5 (Course of theoretical physics)", In Publication of Butterworth-Heinemann, Jan. 15, 1980, 6 Pages.

Lloyd, et al., "Quantum principal component analysis", In Journal of the Nature Physics, vol. 10, Issue 9, Sep. 2014, pp. 631-633.

Poulin, et al., "Sampling from the thermal quantum Gibbs state and evaluating partition functions with a quantum computer", In Journal of Physical Review Letters, vol. 103, Issue 22, Nov. 30, 2009, pp. 1-7.

Yung, et al., "A quantum-quantum metropolis algorithm", In Proceedings of the National Academy of Sciences, vol. 109, Issue 3, Jan. 17, 2012, pp. 754-759.

"Non Provisional Application Filed in U.S. Appl. No. 16/289,417", filed Feb. 28, 2019, 65 Pages.

"International Search Report and Written Opinion Issued in PCT Application No. PCT/US2020/027344", dated Jul. 22, 2020, 12 Pages.

Wu, et al., "Variational Thermal Quantum Simulation via Thermofield Double States", In Repository of arXiv:1811.11756, Nov. 28, 2018, 7 Pages.

* cited by examiner

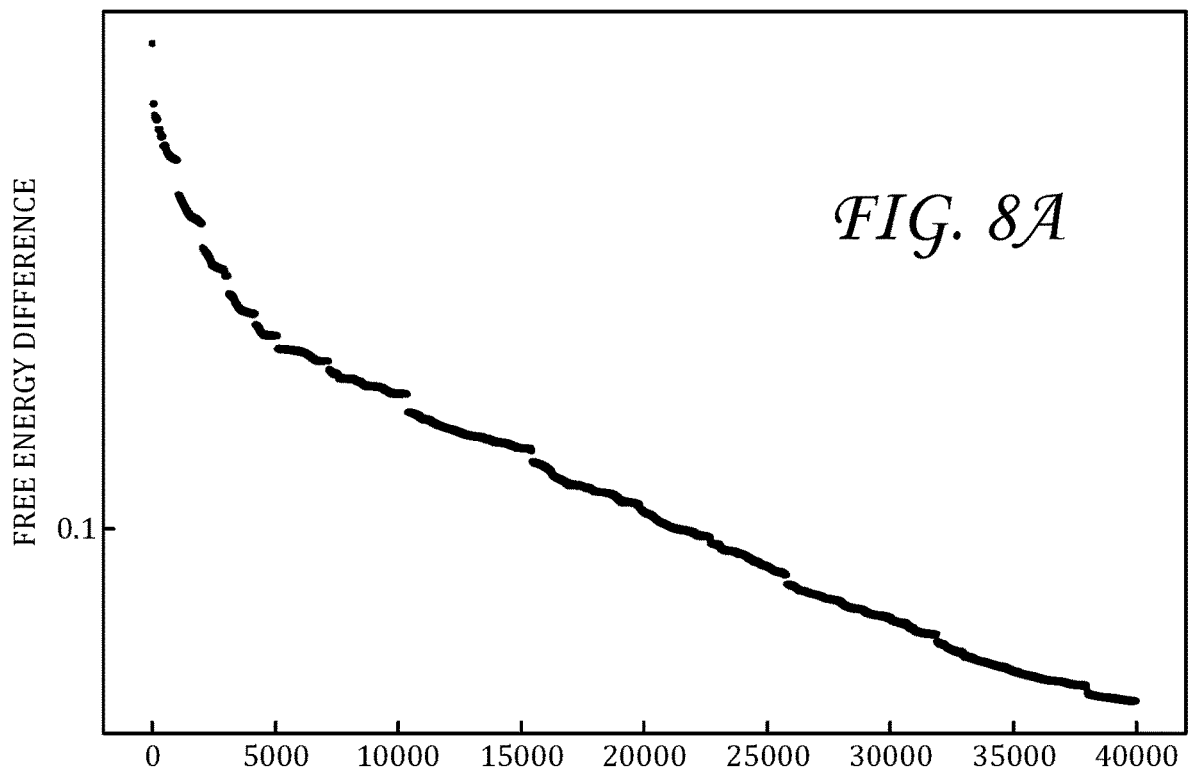
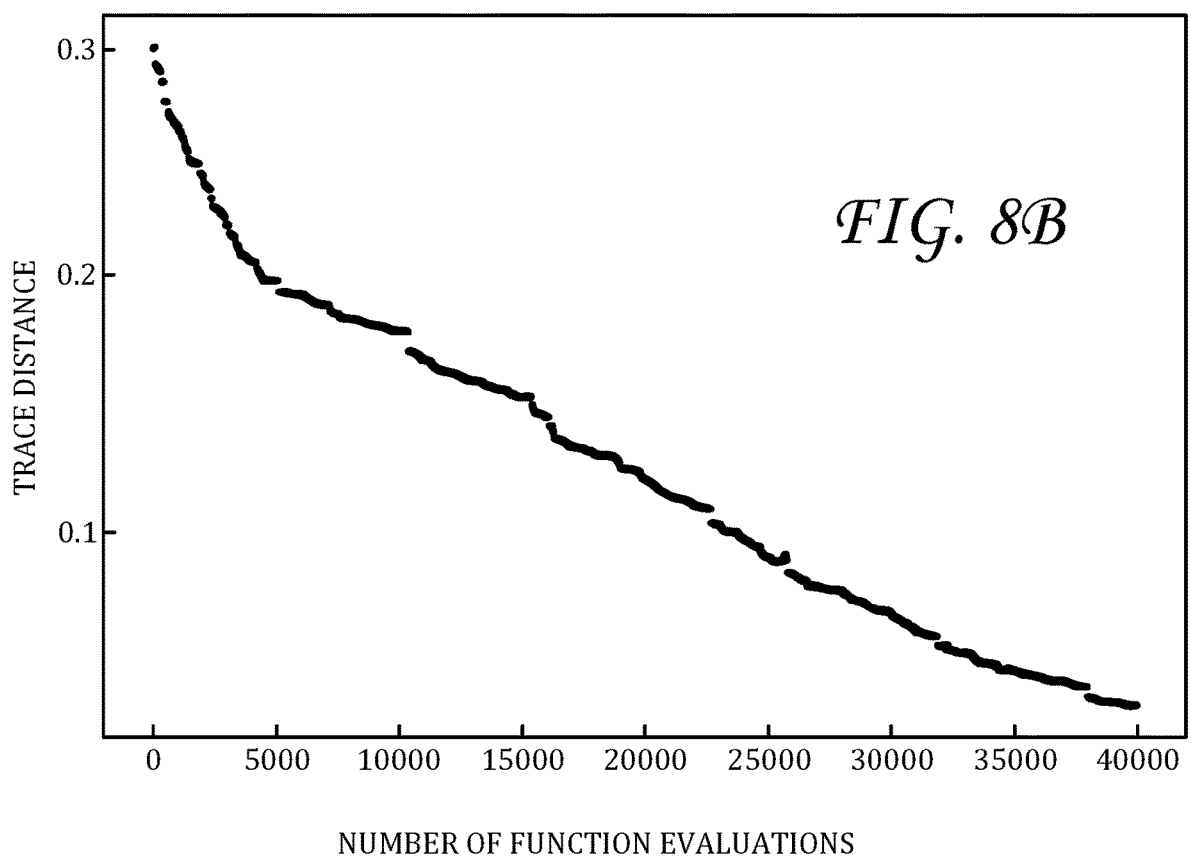
NUMBER OF FUNCTION EVALUATIONS

VARIATIONAL QUANTUM GIBBS STATE PREPARATION

BACKGROUND

A quantum computer is a physical machine configured to execute logical operations based on or influenced by quantum-mechanical phenomena. Such logical operations may include, for example, mathematical computation. Current interest in quantum-computer technology is motivated by theoretical analysis suggesting that the computational efficiency of an appropriately configured quantum computer may surpass that of any practicable non-quantum computer when applied to certain types of problems. Such problems include, for example, integer factorization, data searching, computer modeling of quantum phenomena, function optimization including machine learning, and solution of systems of linear equations. Moreover, it has been predicted that continued miniaturization of conventional computer logic structures will ultimately lead to the development of nanoscale logic components that exhibit quantum effects, and must therefore be addressed according to quantum-computing principles.

Quantum simulation and machine learning are important application areas for quantum computing, and state preparation is an outstanding challenge in both of these areas. In quantum simulation, ground and other low-lying energy states of a Hamiltonian are prepared in order to model chemical systems. This approach may provide predictive insight in the fields of biochemistry, materials science, and catalysis, for example. In quantum machine-learning applications, algorithms to train a quantum neural network (e.g., a quantum Boltzmann machine) may require access to inexpensive thermal-state preparation procedures.

SUMMARY

This disclosure describes, inter alia, methods for preparing a Gibbs state in a qubit register of a quantum computer. One method includes applying one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state. The method further includes evaluating the Gibbs free energy of the trial quantum state, adjusting the parameters $\vec{\theta}$, re-applying the one or more quantum gates to the one or more qubits to refine the trial quantum state according to the parameters $\vec{\theta}$ as adjusted, and re-evaluating the Gibbs free energy of the trial quantum state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A is an example plot showing convergence to a Gibbs state using a variational ansatz for a five qubit Hamiltonian. The plot represents the difference between the free energy of the Gibbs state and the lowest free energy reported by an optimizer up to a corresponding number of function evaluations.

FIG. 8B is an example plot showing convergence to a Gibbs state using a variational ansatz for a five qubit Hamiltonian. The plot represents the trace distance between the true Gibbs state and the state corresponding to the lowest free energy obtained by optimization.

DETAILED DESCRIPTION

Preparation of Gibbs distributions is an important task for quantum computation. It is a first step in some types of quantum simulations and is also applied in quantum Boltzmann training. Nevertheless, most methods for preparing thermal states are impractical to implement on near-term quantum computers because of the memory overheads required. Presented here is a variational approach to preparing Gibbs states which is based on minimizing the free energy of a quantum system. An example is developed that makes use of Fourier-series approximations to the logarithm. The Fourier-series approximation allows the entropy component of the free energy to be estimated through a sequence of simpler measurements that are combined using classical post processing. This strategy is efficient for generating high-temperature Gibbs states, within constant error, provided that the initial guess for the variational parameters of the programmable quantum circuit (vide infra) are sufficiently close to a global optimum. Finally, a numerical examination of the procedure is provided, which demonstrates viability in the case of five-qubit Hamiltonians, using Trotterized adiabatic-state preparation as an ansatz.

Figure 1:
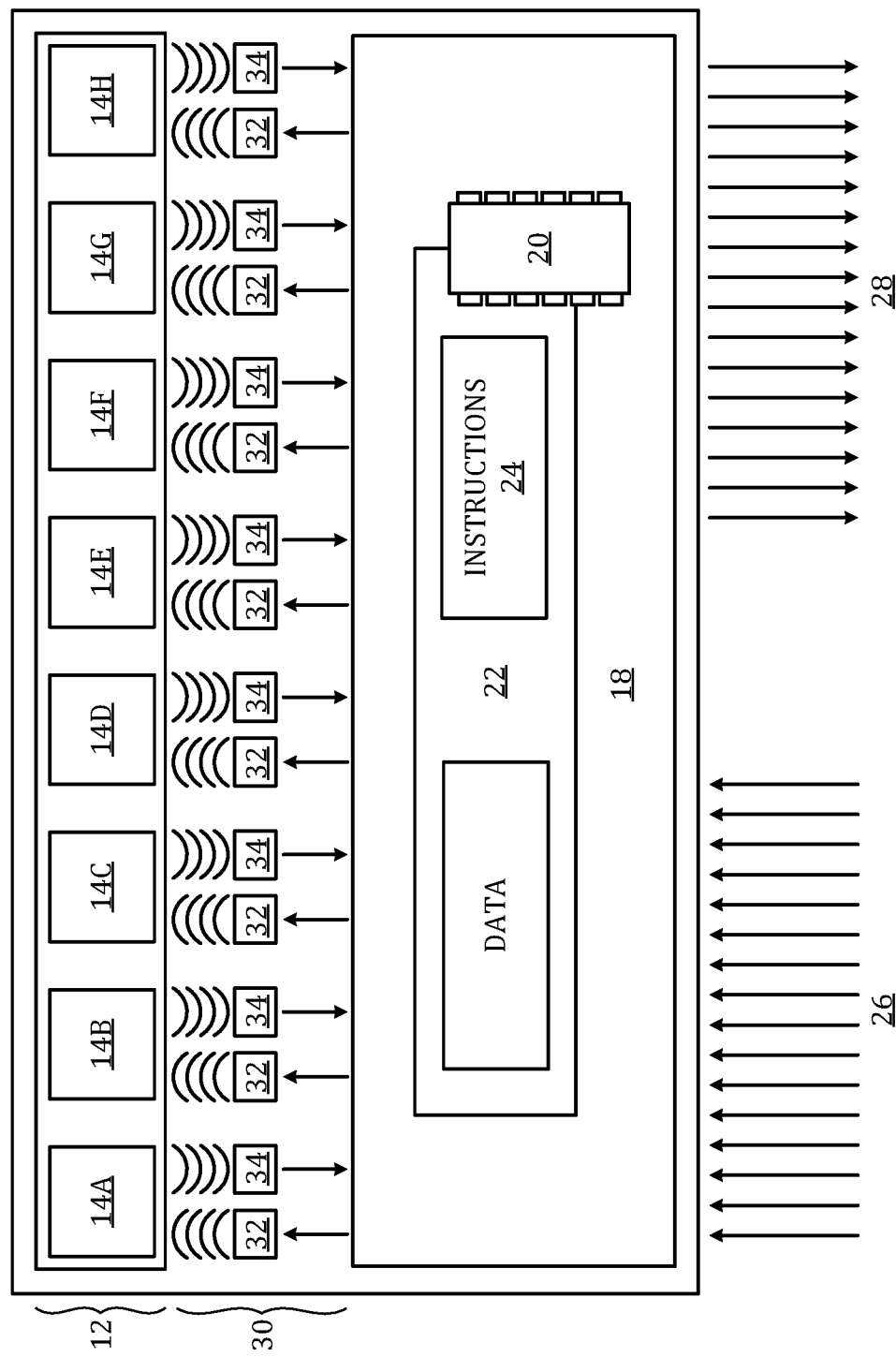
FIG. 1 shows aspects of an example quantum computer.

Prior to exploring Gibbs-state preparation on a quantum computer, some aspects of quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes at least one qubit register 12 comprising an array of qubits 14. The illustrated qubit register is eight qubits in length; qubit registers comprising longer and shorter qubit arrays are also envisaged, as are quantum computers comprising two or more qubit registers of any length.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. More generally, each qubit 14 may comprise any particle or system of particles that can exist in two or more discrete quantum states that can be measured and manipulated experimentally. For instance, a qubit may be implemented in the plural processing states corresponding to different modes of light propagation through linear optical elements (e.g., mirrors, beam splitters and phase shifters), as well as in states accumulated within a Bose-Einstein condensate.

Figure 2:
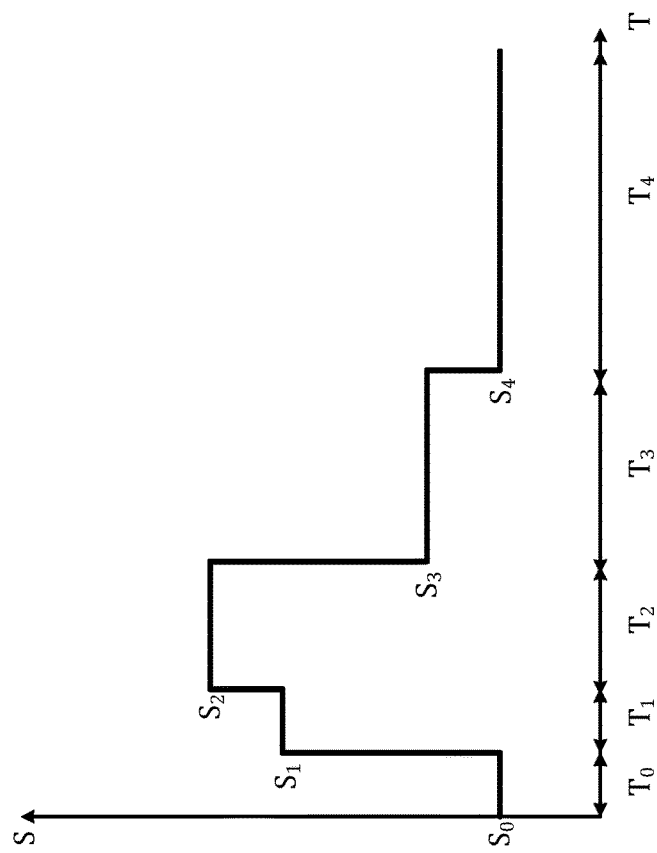
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. A processor 20 of controller 18 may be coupled operatively to peripheral componentry, such as network componentry, to enable the quantum computer to be operated remotely. A processor 20 of controller 18 may take the form of a central processing unit (CPU), a graphics processing unit (GPU), or the like. As such, the controller may comprise classical electronic componentry. The terms 'classical' and 'non-quantum' are applied herein to any component that can be modeled accurately as an ensemble of particles without considering the quantum state of any individual particle. Classical electronic components include integrated, microlithographed transistors, resistors, and capacitors, for example. Computer memory 22 may be configured to hold program instructions 24 that cause processor 20 to execute any function or process of the controller. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 26 and to provide a plurality of outputs 28. The inputs and outputs may each comprise digital and/or analog lines. At least some of the inputs and outputs may be data lines through which data is provided to and extracted from the quantum computer. Other inputs may comprise control lines via which the operation of the quantum computer may be adjusted or otherwise controlled.

Controller 18 is operatively coupled to qubit register 12 via quantum interface 30. The quantum interface is configured to exchange data bidirectionally with the controller. The quantum interface is further configured to exchange signal corresponding to the data bidirectionally with the qubit register. Depending on the architecture of quantum computer 10, such signal may include electrical, magnetic, and/or optical signal. Via signal conveyed through the quantum interface, the controller may interrogate and otherwise influence the quantum state held in the qubit register, as defined by the collective quantum state of the array of qubits 14. To this end, the quantum interface includes at least one modulator 32 and at least one demodulator 34, each coupled operatively to one or more qubits of the qubit register. Each modulator is configured to output a signal to the qubit register based on modulation data received from the controller. Each demodulator is configured to sense a signal from the qubit register and to output data to the controller based on the signal. The data received from the demodulator may, in some examples, be an estimate of an observable to the measurement of the quantum state held in the qubit register.

In some examples, suitably configured signal from modulator 32 may interact physically with one or more qubits 14 of qubit register 12 to trigger measurement of the quantum state held in one or more qubits. Demodulator 34 may then sense a resulting signal released by the one or more qubits pursuant to the measurement, and may furnish the data corresponding to the resulting signal to the controller. Stated another way, the demodulator may be configured to output, based on the signal received, an estimate of one or more observables reflecting the quantum state of one or more qubits of the qubit register, and to furnish the estimate to controller 18. In one non-limiting example, the modulator may provide, based on data from the controller, an appropriate voltage pulse or pulse train to an electrode of one or more qubits, to initiate a measurement. In short order, the demodulator may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 30 may be configured to implement one or more quantum-logic gates to operate on the quantum state held in qubit register 12. Whereas the function of each type of logic gate of a classical computer system is described according to a corresponding truth table, the function of each type of quantum gate is described by a corresponding operator matrix. The operator matrix operates on (i.e., multiplies) the complex vector representing the qubit register state and effects a specified rotation of that vector in Hilbert space.

For example, the Hadamard gate H is defined by $$H = \frac{1}{\sqrt{2}} \begin{bmatrix} 1 & 1 \\ 1 & -1 \end{bmatrix} \quad (1)$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$.

The phase gate S is defined by $$S = \begin{bmatrix} 1 & 0 \\ 0 & e^{i\pi/2} \end{bmatrix}. \quad (2)$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating $\psi$ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \quad (3)$$

The foregoing list of quantum gates and associated operator matrices is non-exhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
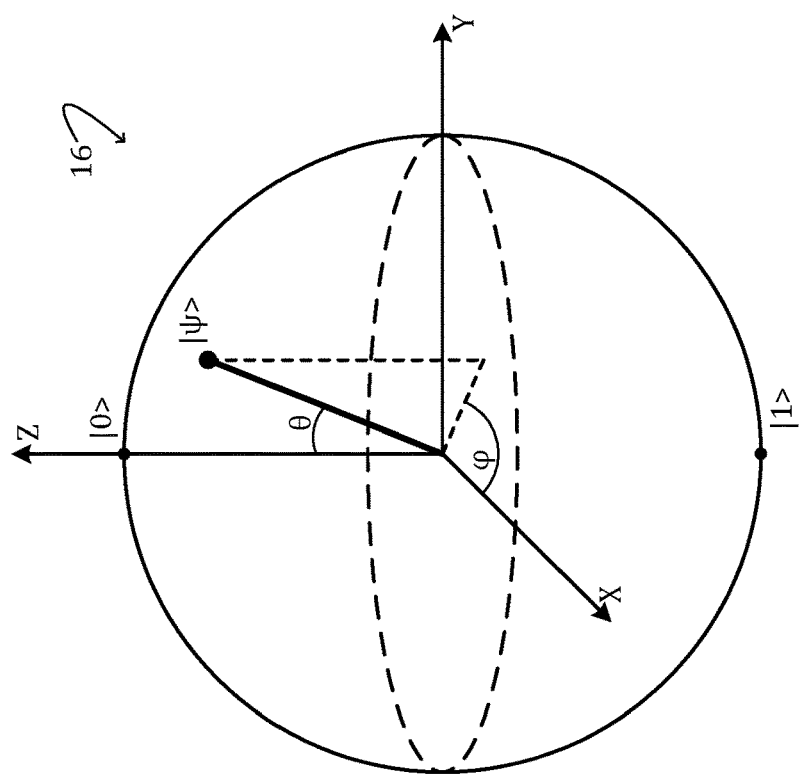
FIG. 3 shows aspects of an example signal waveform for effecting a quantum-gate operation in a quantum computer.

Continuing in FIG. 1, suitably configured signal from modulators 32 of quantum interface 30 may interact physically with one or more qubits 14 of qubit register 12 so as to assert any desired quantum-gate operation. As noted above, the desired quantum-gate operations are specifically defined rotations of a complex vector representing the qubit register state. In order to effect a desired rotation O, one or more modulators of quantum interface 30 may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of the qubit register. In general, each signal level $S_i$ and each duration $T_i$ is a control parameter adjustable by appropriate programming of controller 18.

The term 'oracle' is used herein to describe a predetermined sequence of elementary quantum-gate and/or measurement operations executable by quantum computer 10. An oracle may be used to transform the quantum state of qubit register 12 to effect a classical or non-elementary quantum-gate operation or to apply a density operator, for example. In some examples, an oracle may be used to enact a predefined 'black-box' operation $f(x)$, which may be incorporated in a complex sequence of operations. To ensure adjoint operation, an oracle mapping n input qubits $|x\rangle$ to m output or ancilla qubits $|y=f(x)\rangle$ may be defined as a quantum gate $O(|x\rangle \otimes |y\rangle)$ operating on the (n+m) qubits. In this case, O may be configured to pass the n input qubits unchanged but combine the result of the operation $f(x)$ with the ancillary qubits via an XOR operation, such that $O(|x\rangle \otimes |y\rangle) = |x\rangle \otimes |y \oplus f(x)\rangle$. As described further below, a Gibbs-state oracle is an oracle configured to generate a Gibbs state based on a quantum state of specified qubit length.

Implicit in the description herein is that each qubit 14 of qubit register 12 may be interrogated via quantum interface 30 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting oracle that reveals the quantum state of the logical qubit with confidence.

Gibbs State Preparation

Methods have been derived for preparing thermal states. The two most popular approaches use quantum rejection sampling from an infinite temperature state [1] or a quantum walk [2]. While efficient preparation of Gibbs states is unlikely to be efficient generally (unless BQP=QMA), it is known to be efficient if the ratio of the partition functions of the infinite temperature state and the Gibbs state is polynomially large or the gap of the Markov chain that describes the quantum walk is polynomially small. Notably, neither method can use prior knowledge about the Gibbs state to provide an advantage for state preparation (with the notable exception of classical Gibbs-state preparation).

This disclosure presents a new variational method to prepare Gibbs states, which can be run on either a fault-tolerant quantum computer or a near-term quantum-computer device. In a sense, this disclosure generalizes variational eigensolvers, which emerge in the zero-temperature limit of the algorithms herein. The idea behind this work stems from the variational property of Gibbs states, which requires that the Gibbs state is the state of a system that minimizes the free energy at fixed temperature. In particular, with a circuit capable of producing a family of density operators that are parameterized by the vector $\vec{\theta}$, the thermal state $\rho$ is approximately $$\rho \approx \arg\min_{\vec{\theta}}(Tr(\sigma(\vec{\theta})H) - kTTr(\sigma(\vec{\theta})\log\sigma(\vec{\theta}))), \quad (4)$$

where T is the temperature of the system, and k is a constant. The efficiency of this approach hinges on the ability to use intuition about the form of the Gibbs state, to prepare an ansatz state that can be moulded through a hybrid quantum-classical optimization method into the Gibbs state. Accordingly, it succeeds or fails for different reasons than prior methods and so provides independent value.

Figure 4:
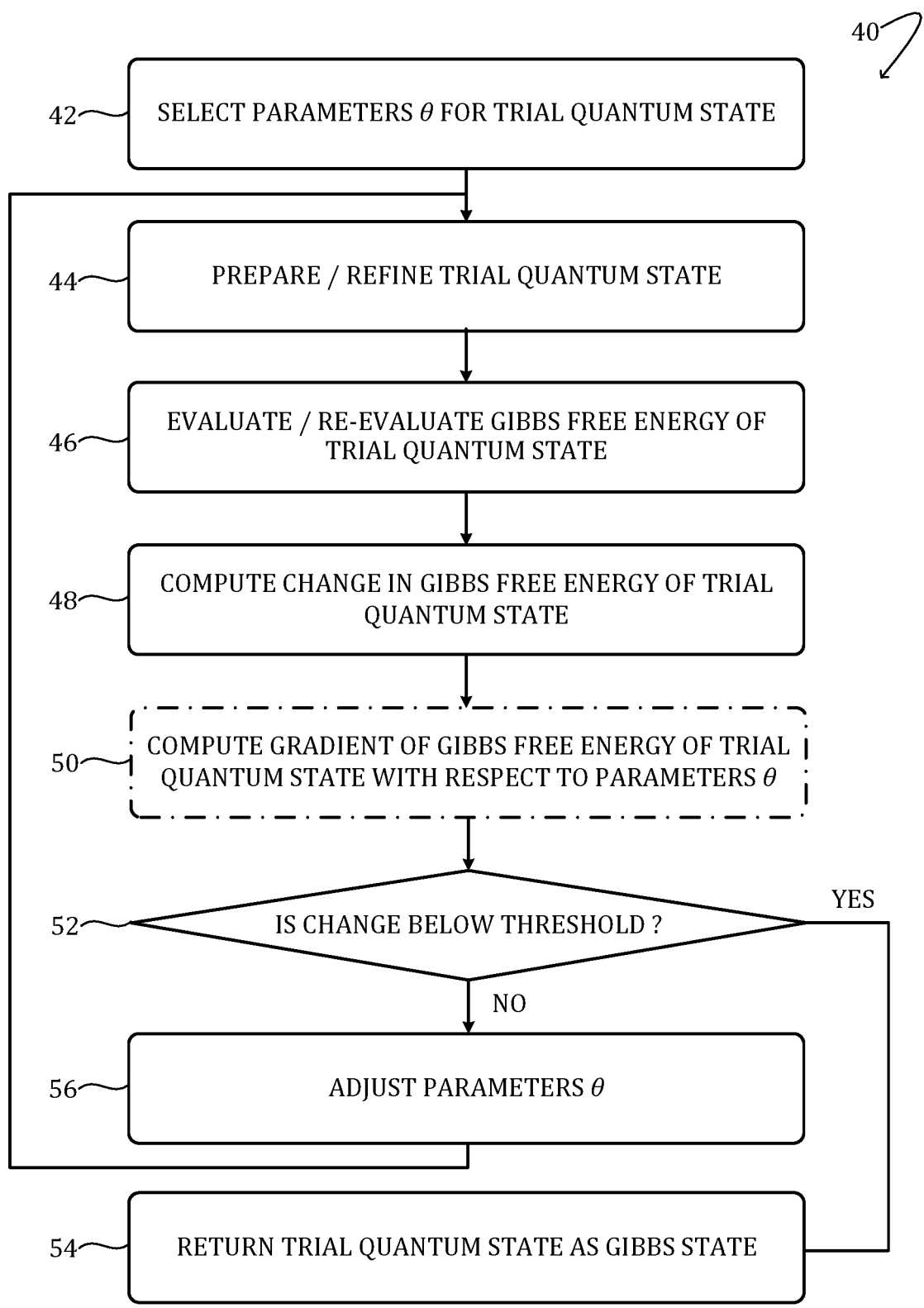
FIG. 4 illustrates an example method for preparing a Gibbs state in a qubit register of a quantum computer.

FIG. 4 illustrates an example method 40 for preparing a Gibbs state in a qubit register of a quantum computer. As described above, the quantum computer is configured to implement one or more quantum gates. The quantum computer may be a fault-tolerant quantum computer or a near-term quantum-computer device, for example. For efficiency of description, some aspects of FIG. 4 are introduced briefly below and developed in greater detail hereinafter.

At 42 of method 40, a vector of parameters J appropriate for a trial quantum state is selected. At 44 the trial quantum state is prepared in the qubit register based on the selected parameters. As described hereinafter, preparation of the trial quantum state includes application of one or more quantum gates to one or more qubits of the qubit register, coordinated with measurement of the evolving trial quantum state. In this manner, a trial quantum state is prepared that spans the one or more qubits and is defined as a function of the parameters $\vec{\theta}$. Owing to appropriate selection of the parameters at 42, the trial quantum state prepared at 44 may serve as an initial, ansatz estimate of the desired Gibbs state. In some examples, the trial quantum state as selected is a purified density matrix. In some examples, the trial quantum state is a Trotterized adiabatic state.

At 46 of method 40, the Gibbs free energy of the trial quantum state is evaluated. In some implementations, the Gibbs free energy may be evaluated at a fixed, finite temperature. In subsequent iterations through method 40, the trial quantum state is refined at 44, and Gibbs free energy of the refined trial quantum state is re-evaluated at 46. At 48, accordingly, the delta, or change in the Gibbs free energy is computed relative to the previous evaluation. In method 40, the delta is used as an indication that the trial quantum state has converged to the desired Gibbs state. The delta may also be used to compute the gradient of the Gibbs free energy, in some implementations.

At optional step 50, the gradient of the Gibbs free energy of the trial quantum state is computed with respect to the parameters $\vec{\theta}$. In some examples, the gradient may be computed in the classical, non-quantum controller portion of the quantum computer. In other examples, quantum manipulations of the qubit register may be used to compute the gradient. The detailed manner of computing the gradient of the Gibbs free energy of the trial quantum state is not particularly limited.

At 52 it is determined whether the delta computed at 48 is below a predetermined threshold. If the delta is below the predetermined threshold, then method 40 advances to 54, where the trial quantum state at its current level of refinement is returned as the desired Gibbs state. If the delta is above the threshold, then the method advances to 56, where, the vector of parameters $\vec{\theta}$ is adjusted so as to lower the Gibbs free energy of the trial quantum state. The parameters may be adjusted in any suitable manner. In examples in which the gradient of the Gibbs free energy of the trial quantum state is computed at 50, the gradient may be used to guide the adjustment of the parameters. Any suitable gradient-based optimization method may be applied-a steepest-decent method, for instance. Gradient-based optimization is attractive in scenarios in which the Gibbs free energy is a strongly convex function of the parameters $\vec{\theta}$. In other examples, the parameters may be adjusted without estimation of the gradient of the Gibbs free energy. Any suitable gradient-free method may be applied—Powell's method, for instance. Gradient-free optimization is attractive in scenarios in which evaluation of the Gibbs free energy is subject to significant stochastic noise.

From 56, method 40 returns to 44, where the one or more quantum gates are re-applied to the one or more qubits so as to refine the trial quantum state according to the parameters $\vec{\theta}$ as adjusted. In some implementations, the trial quantum state may be prepared afresh at each iteration through method 40.

Free Energy Estimation

In this section, a method is developed to prepare a pseudo-pure state that approximates a thermal state for a fixed Hamiltonian. This is achieved by using an algorithm to estimate the entropy and phase estimation to estimate the mean energy of the evolving state. In some examples, a gradient-descent search on the resulting free energy is then applied. From this perspective, variational Gibbs state preparation resembles a finite-temperature version of variational quantum eigensolvers. The free-energy estimation involves matrix exponentiation combined with the iterative phase estimation circuit of FIG. 6 (vide supra), to build a Fourier series approximation to the von Neumann entropy.

Figure 5:
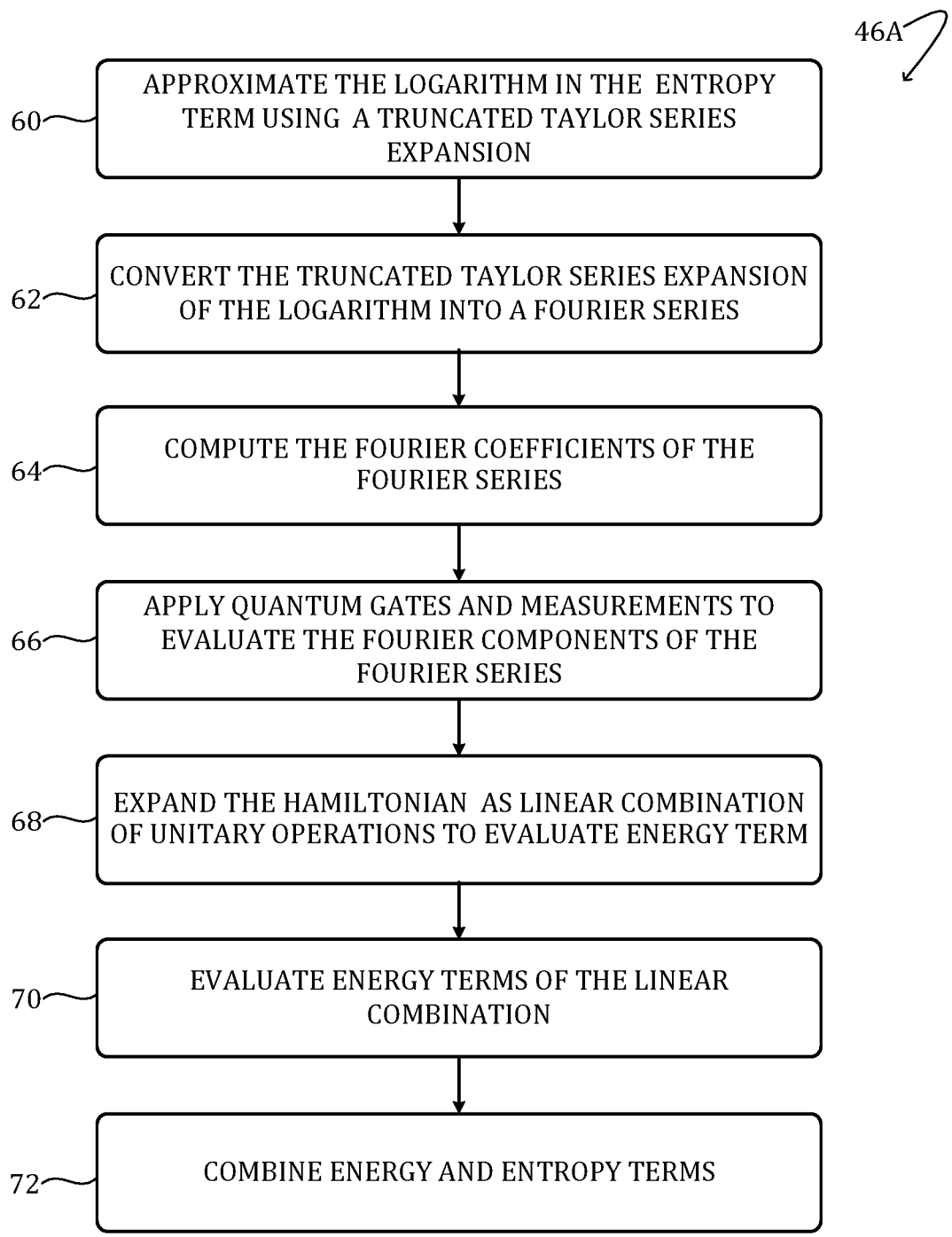
FIG. 5 illustrates an example method for evaluating the Gibbs free energy of a trial quantum state.

FIG. 5 illustrates an example method 46A for evaluating the Gibbs free energy of a trial quantum state. For purpose of evaluation, the Gibbs free energy may be defined as the difference $$Tr[\sigma(\vec{\theta})H] - kTTr[\sigma(\vec{\theta})\log \sigma(\vec{\theta})], \qquad (5)$$

of energy and entropy terms, wherein operator H is a fixed Hamiltonian operator, distribution σ is a function of the parameters $\vec{\theta}$, T is the temperature, k is the Boltzmann constant, Tr represents a trace, and log represents a natural logarithm. Again, aspects of FIG. 5 are introduced briefly below and developed in greater detail hereinafter.

From 60 through 66 of method 46A, the entropy term of Eq. (5) is estimated. At 60 the logarithm in the entropy term is approximated using a truncated Taylor series expansion. At 62 the truncated Taylor series expansion is converted into a Fourier series. In this manner, the entropy term of Eq. (5) is expanded as a Fourier series, according to $$Tr[\rho\log\rho] \approx \sum_m c_m^{(1)} Tr[\rho\cos(j\rho)] + \sum_m c_m^{(2)} Tr[\rho\sin(j\rho)]. \qquad (6)$$

To compute this sum, nonlinear functions of ρ are applied, and the resulting traces are evaluated.

At 64, accordingly, the Fourier coefficients $c_m^{(p)}$ of the Fourier series are computed. The Fourier coefficients may be computed in the classical, non-quantum controller portion of the quantum computer. At 66, however, one or more quantum gates and coordinated measurement are applied to the qubit register of the quantum computer in order to evaluate the Fourier components Tr[ρ cos(jρ)] and Tr[ρ sin(jρ)] of the Fourier series. In particular, the one or more quantum gates may be applied so as to exponentiate the density matrix, in concert with iterative phase estimation, as described below.

From 68 through 72 of method 46A, the energy term of Eq. (5) is estimated. The estimation method is applicable to a mixed state, generally, given appropriate purification of the density operator. At 68 the Hamiltonian is expanded as a linear combination of unitary operations. The unitary operations are controlled by successive application of Hadamard tests, also as described below. At 70 the energy terms of the linear combination are evaluated in this manner. At 72 the energy and entropy terms are combined to yield an estimate of the Gibbs free energy of the trial quantum state.

Entropy Estimation

Theorem 1.

Given access to an oracle $U_\rho$ that prepares a purification $\Sigma_j p_j |j\rangle |\psi_j\rangle$ or a density matrix $\rho = \Sigma_j p_j |\psi_j\rangle\langle\psi_j|$ where $p_j \geq p_{min}$, the von-Neumann entropy of the state ρ can be estimated within error ε with probability greater than ⅔ with $\tilde{O}(1/p_{min}^2 \epsilon)$ preparations of the purified density operator.

Figure 6:
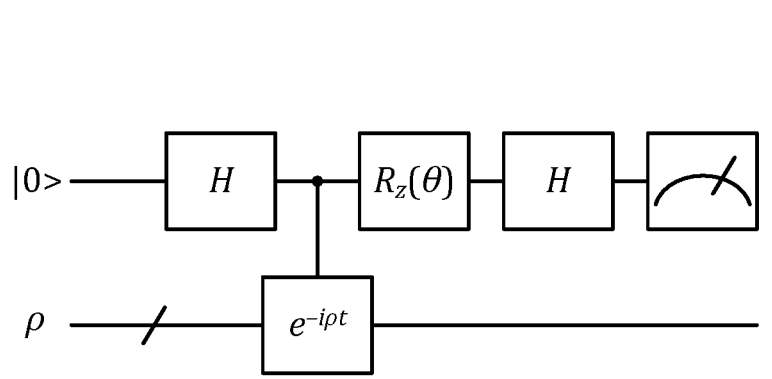
FIG. 6 illustrates an example quantum circuit for estimating individual terms in a Fourier series in connection to the method of FIG. 5.

Returning briefly to the drawings, FIG. 6 illustrates an example quantum circuit 74 for estimating individual terms in the Fourier series expansion of Eq. (6), where the outcomes are labeled as + or − corresponding to 0 or 1, respectively. In the topmost qubit of the qubit register, a Hadamard gate is applied to the $|0\rangle$ state. The result is used to control exponentiation of the density matrix ρ. The result is also subject to a rotation through an angle θ, followed by another Hadamard gate, and finally by measurement. The behavior of the circuit is formally stated below.

Lemma 1.

For any $t \in \mathbb{R}$ and $\theta \in \mathbb{R}$ in the circuit of FIG. 6 the probability of yielding $y \in \{+, -\}$ is $Pr(y|\theta) = \frac{1}{2}(1+yTr(\rho \cos(\rho t + \theta/2)))$.

Proof.

$$|0\rangle\langle 0| \otimes \rho \mapsto_H \frac{1}{2}(|0\rangle\langle 0| + |1\rangle\langle 0| + |0\rangle\langle 1| + |1\rangle\langle 1|) \otimes \rho \quad (7)$$

$$\mapsto_{\Lambda(e^{-i\rho t})} \frac{1}{2}(|0\rangle\langle 0| \otimes \rho + |1\rangle\langle 0| \otimes \rho e^{-i\rho t} + |0\rangle\langle 1| \otimes \rho e^{i\rho t} + |1\rangle\langle 1| \otimes \rho)$$

$$\mapsto_{Rz} \frac{1}{2}(|0\rangle\langle 0| \otimes \rho + |1\rangle\langle 0| \otimes \rho e^{-i(\rho t+\theta)} + |0\rangle\langle 1| \otimes \rho e^{-(\rho t+\theta)} + |1\rangle\langle 1| \otimes \rho)$$

$$\mapsto_H \frac{1}{4}(|0\rangle\langle 0| \otimes \rho(2\mathbb{1} + 2\cos(\rho t+\theta)) + |1\rangle\langle 1| \otimes \rho(2\mathbb{1} - 2\cos(\rho t+\theta))) + \ldots,$$

where above all terms having zero trace are neglected. Thus if the 0/1 outcomes of the measurement are interpreted as +/−, respectively, then $$Pr(y|\theta) = Tr(\frac{1}{2}(\rho + y\rho \cos(\rho t+\theta))) = \frac{1}{2}(1+yTr(\rho \cos(\rho t+\theta))). \quad (8)$$

In particular, choosing $\theta=0$ and $\theta=\pi$ provides the following probabilities, $$Pr(y|0) = \frac{1}{2}(1+yTr(\rho \cos(\rho t))), \quad (9)$$

$$Pr(y|\pi) = \frac{1}{2}(1+yTr(\rho \sin(\rho t))). \quad (10)$$

Thus, given a Fourier series approximation to a function $f(x)$, it is possible to evaluate the functional $\rho f(\rho)$ of a density matrix ρ through repeated uses of the circuit in FIG. 6. Therefore, coefficients $b_m^{(1)}$, $b_m^{(2)}$ and times of evolution $t_m$ will be found so that, for all $p_j \in [p_{min}, 1]$, $$\left| -\sum_{j=1}^{N} p_j \left[ \log p_j - \sum_m (b_m^{(1)} \cos(p_j t_k) + b_m^{(2)} \sin(p_j t_k)) \right] \right| \leq \epsilon, \quad (11)$$

for some $\epsilon > 0$. This is achieved by approximating the logarithm with a truncated Taylor series, which is then converted to a Fourier series by using a result from [3].

The following lemma shows the maximum degree of the Taylor series required to approximate the logarithm.

Lemma 2.

For $p \in [p_{min}, 1]$ and all $\epsilon > 0$, $\exists K \in \mathbb{Z}_+$ such that, $$\left| \ln(p) - \sum_{k=1}^{K} a_k (1-p)^k \right| \leq \frac{\epsilon}{4} \quad (12)$$

where $$K \in \Theta\left(\frac{\log(1/\epsilon)}{p_{min}}\right), \quad (13)$$

$$\|a\|_1 \in O\left(\log\left(\frac{\log(1/\epsilon)}{p_{min}}\right)\right)$$

Proof.

Truncating the Taylor series of ln(p) for $p \in [p_{min}, 1]$ at order K gives, $$\left| \ln(p) - \sum_{k=1}^{K} \frac{(1-p)^k}{k} \right| = \sum_{k=K+1}^{\infty} \frac{(1-p)^k}{k} \leq \frac{1}{K+1} \sum_{k=K+1}^{\infty} (1-p)^k \leq \quad (14)$$

$$\frac{1}{K+1} \int_K^{\infty} (1-p)^k dk$$

$$= \frac{(1-p_{min})^K}{(K+1)\log(1/p_{min})} \leq \frac{(1-p_{min})^K}{K+1}.$$

This error is at most $\epsilon$ if $$K \geq -1 + \frac{W_0\left(\frac{-\log(1-p_{min})}{\epsilon(1-p_{min})}\right)}{-\log(1-p_{min})} \quad (15)$$

To suppress the r.h.s. to $O(\epsilon)$, it suffices to choose $$K \in \Theta\left(\frac{\log(1/\epsilon(1-p_{min}))}{-\log(1/[1-p_{min}])}\right) = \Theta\left(\frac{\log(1/\epsilon)}{p_{min}}\right) \quad (16)$$

the last step being valid for $p_{min} \in (0, 1]$. Also, the coefficients in the expansion add up to $$\|a\|_1 = \sum_{k=1}^{K} \frac{1}{k} = H_K \quad (17)$$

where $H_K$ is the $K^{th}$ harmonic number which obeys [4]

$$\frac{1}{2K+1} \leq H_K - \ln K - \gamma \leq \frac{1}{2K}, \quad (18)$$

γ being the Euler-Mascheroni constant), from which it follows that $$\|a\|_1 \in O(\log K). \quad (19)$$

The lemma follows from (16) and (19).

Next a lemma by van Apeldoorn et al [3] is used, which allows efficient conversion of the truncated Taylor series to a Fourier series with degree that is almost the same (up to logarithmic factors). The lemma is shown below for completeness.

Lemma 3.

[3] For $\delta \in (0,1)$ and $f: \mathbb{R} \to \mathbb{C}$ s. t.$|f(x) - \Sigma_{k=0}^{K} a_k x^k| \leq \epsilon/4$ for all $x \in [-1+\delta, 1-\delta]$ and $\epsilon \in (0, 4\|a\|_1]$. Then $\exists c \in \mathbb{C}^{2M+1}$ s. t.

$$\left| f(x) - \sum_{m=-M}^{M} c_m e^{i\pi mx/2} \right| \leq \epsilon \tag{20}$$

for all $x \in [-1+\delta, 1-\delta]$, where $$M = 2\left\lceil \ln\left(\frac{4\|a\|_1}{\epsilon}\right)\frac{1}{\delta}\right\rceil$$

and $\|c\|_1 \leq \|a\|_1$. Moreover c can be efficiently calculated on a classical computer in time poly(K, M, log(1/$\epsilon$)).

Lemma 4.

For $p \in [p_{min}, 1]$ and all $\epsilon > 0$, $\exists M \in \mathbb{Z}_+$ such that, $$\left| \ln p - \sum_{k=1}^{M} \left(b_k^{(1)} \cos(pt_k) + b_k^{(2)} \sin(pt_k)\right) \right| \text{ where} \tag{21}$$

$$M \in O\left(\frac{\log(1/p_{min}\epsilon)}{p_{min}}\right), \|b\|_1 = \|b_k^{(1)}\| + \|b_k^{(2)}\| = O\left(\log\left(\frac{\log(1/\epsilon)}{p_{min}}\right)\right) \tag{22}$$

Proof.

It follows from lemmas 3 and 2 that it is possible to find $$f(p) = \sum_{m=-M}^{M} c_m e^{i\pi m(1-p)/2} \tag{23}$$

such that $|\ln(p) - f(p)| \leq \epsilon$ where the maximum degree is $$M \in O\left(\frac{1}{p_{min}} \log\left(\frac{\log K}{\epsilon}\right)\right) = O\left(\frac{1}{p_{min}}\left(\log\left(\frac{1}{\epsilon}\right) + \log\log\left(\frac{1}{p_{min}}\right)\right)\right) \tag{24}$$

the coefficients $c_j$ can be computed in time poly (K, M log(1/$\epsilon$)) and have 1-norm $$\|c\|_1 \in O\left(\log\left(\frac{\log(1/\epsilon)}{p_{min}}\right)\right). \tag{25}$$

Now note that $$ae^{ip} + be^{-ip} = (a+b)\cos p + (a-ib)\sin p,$$

$$e^{\pm i\pi m(1-p)/2} = e^{\pm i m\pi/2} e^{\mp i\pi mp},$$

allowing $f(p)$ to be rewritten as $$f(x) = \sum_{m=1}^{M} \left(b_m^{(1)} \cos(\pi mp/2) + b_m^{(2)} \sin(\pi mp/2)\right), \tag{26}$$

where the coefficients $b_j^{(1)}$'s and $b_j^{(2)}$'s can be computed in time $O(1)$ from the $c_j$'s. The proof follows.

Algorithm

1. Choose $t_m$, $m \in \{1, M\}$ according to the conditions of Lemma 4.

2. For each $m \in \{1, M\}$, and $\theta=0$ and $\theta=\pi$, use quantum amplitude estimation on the circuit of FIG. 6 to estimate the probabilities in Eq. (9) to precision $\epsilon/|b|_1$; this provides estimates of Tr $(\rho \cos(\rho t_m))$ and Tr $(\rho \sin(\rho t_m))$ within the same precision.

3. Compute an estimate of the entropy as $$\widetilde{S}(\rho) = \sum_{m=1}^{M} \left(b_m^{(1)} Tr(\rho \cos(\rho t_m)) + b_m^{(2)} Tr(\rho \sin(\rho t_m))\right), \tag{27}$$

where the coefficients are as defined in Lemma 4.

Complexity

The complexity of entropy estimation is analyzed in terms of the uses of the oracle $U_\rho$, which is expected to be the most expensive part of the algorithm. The evaluation also requires a number of two qubit gates to implement controlled operations, but these will at most be a constant factor more.

An important component of the algorithm is the ability to simulate time evolution with $\rho$, i.e., density matrix exponentiation given access to $U_\rho$. An efficient protocol for achieving this was given by Low and Chuang [5] using the techniques of qubitization and quantum signal processing. The relevant result (corollary 9 of [5]) is restated below as a lemma.

Lemma 5.

Given access to an oracle $U_\rho$ that prepares a purification $\Sigma_j p_j |j\rangle |\psi_j\rangle$ or a density matrix $\rho = \Sigma_j p_j |\psi_j\rangle \langle \psi_j|$, time evolution with $\rho$ for time t and to precision $\epsilon$(in the spectral norm) can be simulated with a number of queries to $U_\rho$ that is in $O(t+\log(1/\epsilon))$.

Each term in Eq. (27) may be evaluated with the same precision $\epsilon' = \epsilon/\|b\|_1$. This condition is met for simulations defined to be accurate to within precision $\epsilon'/2$, where amplitude estimation is also required to return an estimate to with precision $\epsilon'/2$.

Proof of Theorem 1.

Following Lemma 5, the cost of simulating time evolution with $\rho$ to precision $\epsilon'/2$ is $$O(t+\log(1/\epsilon')). \tag{28}$$

The overall number of queries to $U_\rho$ needed to estimate a term in Eq. (27) using amplitude estimation (which exponentiates $\rho$ for time t) within error $\epsilon$ and probability of failure at most $\epsilon$ is in, $$O\left(\left(\frac{\|b\|_1}{\epsilon}\right)(t + \log(1/\epsilon) + \log\|b\|_1)\right) \tag{29}$$

The exponentiation time $t_m$ takes values $m\pi$ for $m \in \{1, M\}$, where M is the maximum degree of the Fourier series approximation to the von Neumann entropy in Lemma 4. Thus the overall cost of entropy estimation (in terms of the uses of $\rho$) turns out to be $$C_S \in O\left(\left(\frac{\|b\|_1}{\epsilon}\right) \sum_{m=1}^{M} (m + \log(1/\epsilon) + \log\|b\|_1)\right) \tag{30}$$

$$= O\left(\left(\frac{\|b\|_1}{\epsilon}\right)(M^2 + M\log(1/\epsilon) + M\log\|b\|_1)\right) \tag{31}$$

$$= O\left(\frac{1}{\epsilon p_{min}^2}\right). \tag{32}$$

Energy Estimation

Estimating the energy for a mixed state, given an appropriate purification of the density operator, is a comparably easy task compared to estimating the von-Neumann entropy. The approach taken here uses the Hadamard test in conjunction with ideas from linear-combinations of unitaries to estimate the average energy and is similar to the results of [6]. It is assumed that the Hamiltonian is represented as a linear combination of unitary operations, $$H = \sum_{k=1}^{K} \alpha_k V_k \tag{33}$$

where the coefficients can be taken to be positive without any loss of generality. Efficient representations of such form exist for many systems of interest, e.g., qubit Hamiltonians.

Further assumed is access to oracles $U_P$ and $U_S$, defined as follows:

$$U_P : |0\rangle \to \frac{1}{\sqrt{|\alpha|_1}} \sum_{k=1}^{K} \sqrt{\alpha_k} \, |k\rangle, \tag{34}$$

$$U_S = \sum_{k=1}^{K} |k\rangle\langle k| \otimes V_k. \tag{35}$$

The performance of the algorithm in terms of these oracles is stated below.

Figure 7:
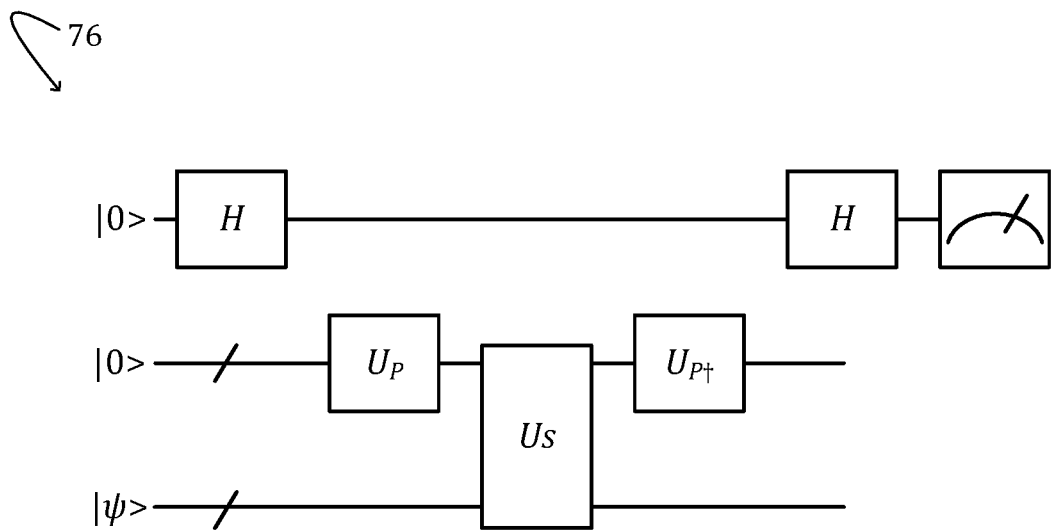
FIG. 7 illustrates an example quantum circuit for estimating mean energy in connection to the method of FIG. 5.

FIG. 7 illustrates an example circuit 76 to estimate the energy of the trial quantum state. In this circuit, a first Hadamard gate is applied to $|0\rangle$ in the top qubit of the register. The result of the first Hadamard operation is used to control the exponentiation of the density matrix ρ. The result of the first Hadamard operation is then subjected to an $R_z$ phase shift by the amount θ. The phase-shifted result is then subject to a second Hadamard gate prior to measurement, which collapses the qubit state to 0 or 1.

Theorem 2.

Let H is a Hamiltonian that can be represented as in Eq. (33) for K∈ O(log N), and let $U_\psi$ be a unitary that prepares a state $|\psi\rangle$. The number of applications of the unitaries $U_P$, $U_S$ and the unitary $U_\psi$ to estimate the average energy $\langle \psi|H|\psi \rangle$ within error ε with probability at least ⅔ is in $$O(\|\alpha\|_1/\epsilon) \tag{36}$$

The average energy can be estimated from the measurement statistics of the first qubit in FIG. 7, as stated in the following lemma.

Lemma 6.

The probability of obtaining outcome y=+1 from the circuit of FIG. 7 is $$Pr(+1) = \frac{1}{2}\left(1 + \frac{\langle \psi|H|\psi \rangle}{|\alpha|_1}\right) \tag{37}$$

Proof.

The state of the system in FIG. 7 before the final Hadamard is given by $$|\Psi_f\rangle = \frac{1}{\sqrt{2}}\left(|0\rangle \otimes |0\rangle_p \otimes |\psi\rangle + |1\rangle \otimes \frac{1}{\sqrt{|\alpha|_1}} \sum_{k=1}^{K} \sqrt{\alpha_k} \, U_P^\dagger|k\rangle_p \otimes V_k|\psi\rangle\right) \tag{38}$$

Therefore, the probability of obtaining outcome +1 on measuring the topmost qubit is given by, $$Pr(0) = Tr(|+\rangle\langle+| \otimes \mathbb{1}_P \otimes \mathbb{1} \, |\Psi_f\rangle\langle\Psi_f|) = Tr(\langle+|\Psi_f\rangle\langle\Psi_f|+\rangle) \tag{39}$$

$$= \frac{1}{4} Tr\left(|0\rangle\langle 0|_p \otimes |\psi\rangle\langle\psi| + \frac{1}{|\alpha|_1}\sum_{j,k=1}^{K} \sqrt{\alpha_j \alpha_k}\, U_P^\dagger|j\rangle\right.$$

$$\langle k|_p U_P \otimes V_j|\psi\rangle\langle\psi|V_k^\dagger + \frac{1}{\sqrt{|\alpha|_1}}\sum_{k=1}^{K}\sqrt{\alpha_k}$$

$$\left.(|0\rangle\langle k|_p U_P \otimes |\psi\rangle\langle\psi|V_k^\dagger + U_P^\dagger|k\rangle\langle 0|_p \otimes V_k|\psi\rangle\langle\psi|)\right)$$

$$= \frac{1}{4}\left(1 + \frac{1}{|\alpha|_1}\sum_{j,k=1}^{K}\sqrt{\alpha_j\alpha_k}\,\langle j|k\rangle\langle\psi|\psi\rangle + \frac{1}{\sqrt{|\alpha|_1}}\sum_{k=1}^{K}\sqrt{\alpha_k}\right.$$

$$\left.(\langle k|U_P|0\rangle_P\langle\psi|V_k^\dagger|\psi\rangle + \langle 0|U_P^\dagger|k\rangle_P\langle\psi|V_k|\psi\rangle)\right)$$

$$= \frac{1}{2}\left(1 + \frac{1}{|\alpha|_1}\sum_{k=1}^{K}\alpha_k\langle\psi|V|\psi\rangle\right)$$

$$= \frac{1}{2}\left(1 + \frac{\langle\psi|H|\psi\rangle}{|\alpha|_1}\right)$$

where the relation $V^\dagger = V$ has been used, which is required for H to be Hermitian.

Proof of Theorem 2.

The proof follows constructively using the circuit laid out in FIG. 7. As noted by Lemma 6, there exists a circuit that applies O(1) queries to $U_s$ and $U_p$ such that the probability of observing the state in a marked sub-space (denoted by outcome-zero in the top-most qubit in FIG. 7). As the circuit is unitary (if the top-most measurement is omitted) it satisfies the conditions of Theorem 12 of [7], which implies that O(1/δ) queries are needed to learn $$Pr(+1) = \frac{1}{2}\left(1 + \frac{\langle\psi|H|\psi\rangle}{|\alpha|_1}\right)$$

within error δ with probability greater than ⅔. Thus if the objective is to learn $\langle \psi|H|\psi \rangle$ within error ε, then it suffices to take $\delta \le \epsilon/|\alpha|_1$. This completes the proof.

Free Energy Optimization

There are many optimization methods that can be used to minimize the free energy. In practice, gradient-free optimizers such as Powell's method are likely to be among the best approaches for finding the Gibbs state given stochastic noise in the entropy and energy evaluations. However, gradient descent optimization has a notable advantage: the complexity of the optimization process is well understood in the context of strongly convex functions. In this section the complexity of the overall optimization problem in such circumstances is discussed. It is shown that if free energy is sufficiently smooth and if strong convexity (or that all local optima are global optima) is assumed, then free-energy optimization using gradient-descent optimization is efficient.

The gradient may be estimated using a first order difference formula, i.e., $$\frac{\partial f(x)}{\partial x} = \frac{f(x+\delta) - f(x)}{\delta} + O\left(\delta \max\left|\frac{\partial^2 f(x)}{\partial x^2}\right|\right). \quad (40)$$

The following lemma provides the complexity of computing the gradient in the free energy.

Lemma 7.

Let $\rho: \mathbb{R}^N \mapsto \mathbb{C}^{D \times D}$ be Hermitian, full-rank, twice differentiable, $\|\rho^{-1}\| \leq p_{min}$, $\beta > 0$ and let $H = \Sigma_j \alpha_j V_j$ be a Hermitian matrix with for unitary $V_j \in \mathbb{C}^{D \times D}$ with $\alpha_j > 0$. A vector $G \in \mathbb{R}^N$ can be computed such that $$\|G - \nabla(Tr(\rho H) - \beta^{-1} Tr(\rho \log(\rho)))\| \leq \epsilon, \quad (41)$$

using a number of queries that is in $$\tilde{O}\left(\frac{N}{\epsilon^2}\left(\frac{\beta^{-1}}{p_{min}^2} + \|\alpha\|_1\right)\left(\beta\|H\|Tr\left(\left|\frac{\partial^2 \rho}{\partial \theta^2}\right|\right) + Tr\left(\left|\rho \frac{\partial \rho^{-1}}{\partial \theta}\right|\right)^2\right)\right) \quad (42)$$

Proof.

The function to be optimized is $$F(\theta) = Tr(\rho(\theta)H) - \beta^{-1} Tr(\rho(\theta)\log(\rho(\theta))). \quad (43)$$

It is assumed that the state $\rho(\theta)$ is twice differentiable. Now let $\partial_\theta^2 \rho(\theta) = Q^{-1}(\theta)D(\theta)Q(\theta)$ be the diagonalized form of the operator for diagonal matrix $D(\theta)$ and basis transformations $Q$. From Von-Neumann's inequality and the cyclic property of the trace operation, $$Tr\left(\frac{\partial^2 \rho(\theta)}{\partial^2 \theta}H\right) = Tr(D(\theta)Q^{-1}(\theta)HQ(\theta)) \leq \sum_i D_{ii}(\theta)\lambda(Q^{-1}(\theta)HQ(\theta))_{ii}. \quad (44)$$

Here $\lambda(\bullet)$ gives the diagonal eigenvalue matrix for the operator. Then, from the triangle inequality, $$Tr\left(\frac{\partial^2 \rho(\theta)}{\partial^2 \theta}H\right) = \quad (45)$$

$$Tr(D(\theta)Q^{-1}(\theta)HQ(\theta)) \leq \sum_i |D_{ii}(\theta)||\lambda(Q^{-1}(\theta)HQ(\theta))_{ii}| \leq$$

$$Tr\left(\sqrt{\left(\frac{\partial^2 \rho(\theta)}{\partial^2 \theta}\right)\left(\frac{\partial^2 \rho(\theta)}{\partial^2 \theta}\right)^\dagger}\right)\|H\| = Tr\left(\left|\frac{\partial^2 \rho}{\partial \theta^2}\right|\right)\|H\|.$$

Now the comparably more difficult task remains, of computing an upper bound on the second derivative of the von Neumann entropy.

$$\frac{\partial^2 Tr(\rho \log \rho)}{\partial \theta^2} = Tr\left(\frac{\partial^2 \rho}{\partial \theta^2}\log(\rho)\right) + 2Tr\left(\frac{\partial \rho}{\partial \theta}\frac{\partial \log(\rho)}{\partial \theta}\right) + Tr\left(\rho \frac{\partial^2 \log(\rho)}{\partial \theta^2}\right). \quad (46)$$

First, again from Von Neumann's trace inequality and the fact that the eigenvalues of $\rho$ are in $[p_{min}, 1]$, $$\left|Tr\left(\frac{\partial^2 \rho}{\partial \theta^2}\log(\rho)\right)\right| \leq \|\log(\rho^{-1})\|Tr\left(\left|\frac{\partial^2 \rho}{\partial \theta^2}\right|\right) \leq \log\left(\frac{1}{p_{min}}\right)Tr\left(\left|\frac{\partial^2 \rho}{\partial \theta^2}\right|\right). \quad (47)$$

The remaining terms Eq. (47) use an integral expression for the derivative of the logarithm $$\frac{\partial}{\partial \theta}\log(\rho) = \quad (48)$$

$$\int_0^1 (1 - t(1-\rho))^{-1}\frac{\partial \rho}{\partial \theta}(1 - t(1-\rho))^{-1}dt := \int_0^1 A^{-1}\frac{\partial \rho}{\partial \theta}A^{-1}dt.$$

Next let $\langle \phi_j|$ be a complete orthonormal set of left eigenvectors of $\rho \partial_\theta \rho^{-1}$ with eigenvalues $\lambda_j$ then under the assumption that $\rho \partial_\theta \rho^{-1}$ is non-singular (48) yields $$Tr\left(\frac{\partial \rho}{\partial \theta}\frac{\partial \log(\rho)}{\partial \theta}\right) = Tr\left(\int_0^1 \frac{\partial \rho}{\partial \theta}A^{-1}\frac{\partial \rho}{\partial \theta}A^{-1}dt\right) \quad (49)$$

$$= \sum_{j,k}\int_0^1 \left\langle\phi_j\left|\frac{\partial \rho}{\partial \theta}A^{-1}\right|\phi_k\right\rangle\left\langle\phi_k\left|\frac{\partial \rho}{\partial \theta}A^{-1}\right|\phi_j\right\rangle dt.$$

$$= \sum_{j,k}\int_0^1 \left\langle\phi_j\left|\rho\frac{\partial \rho^{-1}}{\partial \theta}\rho A^{-1}\right|\phi_k\right\rangle$$

$$\left\langle\phi_k\left|\rho\frac{\partial \rho^{-1}}{\partial \theta}\rho A^{-1}\right|\phi_j\right\rangle dt.$$

$$= \sum_{j,k}\int_0^1 \lambda_j\lambda_k\langle\phi_j|\rho A^{-1}|\phi_k\rangle\langle\phi_k|\rho A^{-1}|\phi_j\rangle dt \leq$$

$$\int_0^1 \|\rho A^{-1}\|^2 dt Tr\left(\left|\rho\frac{\partial \rho^{-1}}{\partial \theta}\right|\right)^2 \leq$$

$$\max_{p \in [0,1]}\left(\int_0^1 \left|\frac{p}{1-t(1-p)}\right|^2 dt\right) Tr\left(\left|\rho\frac{\partial \rho^{-1}}{\partial \theta}\right|\right)^2$$

$$= \max_{p \in [0,1]}\left(pTr\left(\left|\rho\frac{\partial \rho^{-1}}{\partial \theta}\right|\right)^2\right) = Tr\left(\left|\rho\frac{\partial \rho^{-1}}{\partial \theta}\right|\right)^2.$$

For the present choice of A in Eq. (48), specifically, $$-A^{-1}\frac{\partial A}{\partial \theta}A^{-1} = -tA^{-1}\frac{\partial \rho}{\partial \theta}A^{-1}. \quad (50)$$

Using this, it follows that $$Tr\left(\rho\frac{\partial^2 \log(\rho)}{\partial \theta^2}\right) = \quad (51)$$

$$\int_0^1 \rho A^{-1}\frac{\partial^2 \rho}{\partial \theta^2}A^{-1} + Tr\left(\rho\frac{\partial A^{-1}}{\partial \theta}\frac{\partial \rho}{\partial \theta}A^{-1}\right) + Tr\left(\rho A^{-1}\frac{\partial \rho}{\partial \theta}\frac{\partial A^{-1}}{\partial \theta}\right)dt$$

Now using the von Neumann trace inequality, the triangle inequality and the sub-multiplicative property of the spectral norm, $$\left|\int_0^1 Tr\left(\rho A^{-1}\frac{\partial^2 \rho}{\partial \theta^2}A^{-1}\right)dt\right| \leq Tr\left(\left|\frac{\partial^2 \rho}{\partial \theta^2}\right|\right)\int_0^1 \|A^{-1}\rho A^{-1}\|dt \leq \quad (52)$$

$$Tr\left(\left|\frac{\partial^2 \rho}{\partial \theta^2}\right|\right)\max_{p \in [0,1]}\left(\int_0^1 \frac{p}{(1-t(1-p))^2}dt\right) = Tr\left(\left|\frac{\partial^2 \rho}{\partial \theta^2}\right|\right).$$

Next, from Eq. (50), Eq. (49), and the fact that $(\partial_\theta \rho A^{-1})^2$ is positive semi-definite, $$\left|Tr\left(\int_0^1 \rho \frac{\partial A^{-1}}{\partial \theta} \frac{\partial \rho}{\partial \theta} A^{-1}\right) dt\right| = \left|Tr\left(\int_0^1 \rho t A^{-1} \frac{\partial \rho}{\partial \theta} A^{-1} \frac{\partial \rho}{\partial \theta} A^{-1}\right) dt\right| \leq \tag{53}$$

$$\int_0^1 Tr\left(\left|\left(\frac{\partial \rho}{\partial \theta} A^{-1}\right)^2\right|\right) dt \max_t \|\rho A^{-1}\| \leq Tr\left(\left|\rho \frac{\partial \rho^{-1}}{\partial \theta}\right|\right)^2.$$

By following the exact same argument on the remaining mixed derivative of this form, it follows that $$\left|Tr\left(\rho \frac{\partial^2 \log(\rho)}{\partial \theta^2}\right)\right| \leq Tr\left(\left|\frac{\partial^2 \rho}{\partial \theta^2}\right|\right) + 2Tr\left(\left|\rho \frac{\partial \rho^{-1}}{\partial \theta}\right|\right)^2. \tag{54}$$

Finally, $$\frac{\partial^2 Tr(\rho \log \rho)}{\partial \theta^2} \in O\left(\log\left(\frac{1}{p_{min}}\right) Tr\left(\left|\frac{\partial^2 \rho}{\partial \theta^2}\right|\right) + Tr\left(\left|\rho \frac{\partial \rho^{-1}}{\partial \theta}\right|\right)^2\right), \text{ and} \tag{55}$$

$$\delta \frac{\partial^2 F}{\partial \theta^2} \in O\left(\beta^{-1} \delta(\log(p_{min}^{-1}) + \beta\|H\|) Tr\left(\left|\frac{\partial^2 \rho}{\partial \theta^2}\right|\right) + Tr\left(\left|\rho \frac{\partial \rho^{-1}}{\partial \theta}\right|\right)^2\right). \tag{56}$$

It then follows from the triangle inequality that by combining N such gradient evaluations, the gradient of the free energy can be estimated using a step size of $$\delta \in \Theta\left(\frac{\epsilon \beta}{N}\left(\left(\log(p_{min}^{-1}) + \beta\|H\|\right) Tr\left(\left|\frac{\partial^2 \rho}{\partial \theta^2}\right|\right) + Tr\left(\left|\rho \frac{\partial \rho^{-1}}{\partial \theta}\right|\right)^2\right)^{-1}\right). \tag{57}$$

Also, each of the evaluations of $F(\theta)$ are to be carried out to precision $\epsilon\delta$, which implies that the entropy is to be estimated within error $\beta\epsilon\delta$, and, from Theorems 1 and 2 the number of queries needed to estimate the gradient of the free energy is in $$\tilde{O}\left(\left(\frac{\beta^{-1}}{p_{min}^2} + \|\alpha\|_1\right)\frac{\beta}{\epsilon\delta}\right) \subseteq \tag{58}$$

$$\tilde{O}\left(\frac{N}{\epsilon^2}\left(\frac{\beta^{-1}}{p_{min}^2} + \|\alpha\|_1\right)\left(\beta\|H\| Tr\left(\left|\frac{\partial^2 \rho}{\partial \theta^2}\right|\right) + Tr\left(\left|\rho \frac{\partial \rho^{-1}}{\partial \theta}\right|\right)^2\right)\right).$$

Convergence of Gradient Descent

The above analysis shows that the gradient can be computed using the present method using a relatively small number of queries. While the cost per gradient evaluation is not necessary prohibitive, a challenge remains in estimating the number of steps required to obtain convergence. The following provides an estimate of the number of steps necessary to get close to the minimum free energy, neglecting errors in the free energy estimation.

The flavor of gradient descent here considered has the following form for a function $f(x)$:

$$x_{t+1} = x_t - r \nabla f(x_t) \tag{59}$$

where $r$ is the rate of descent. There are bounds on the convergence of gradient descent in the scenario where the function to be optimized is smooth and strongly convex. $f(x)$ is said to be $\mu$-strongly convex if $$f(x') \geq f(x) + \nabla f(x) \cdot (x' - x) + \frac{\mu}{2}\|x - x'\|^2. \tag{60}$$

$f(x)$ is said to be L-smooth if $$f(x') \leq f(x) + \nabla f(x) \cdot (x' - x) + \frac{L}{2}\|x - x'\|^2. \tag{61}$$

For a function to be both smooth and strongly convex means that it is both upper and lower bounded by quadratic functions. Even if a function is not strongly convex, then the objective function can be made strongly convex within the vicinity of an optima by adding a quadratic function to the objective function that has negligible impact on the derivatives. Thus the assumptions of strong convexity can approximately hold locally even for landscapes that are littered with local optima. Under such assumptions, the following theorem holds [8].

Theorem 3.

Suppose that $f$ is both $\mu$-strongly convex and L-smooth, and has a minimum at $x = x^*$ Then, for a rate of descent $r = 1/L$, $$\|x(t) - x^*\| \leq \left(1 - \frac{\mu}{L}\right)^t \|x(0) - x^*\|, \tag{62}$$

i.e., it converges to within $\epsilon$ distance of $x^*$ in time $O((L/\mu) \log(\|x_0 - x^*\|/\epsilon))$.

Near Term Applications

The current state-of-the-art quantum algorithms for Gibbs state preparation are designed for fault-tolerant devices and in particular require significant circuit depth and a large overhead in terms of ancilla qubits, rendering them unsuitable for use in a near-term quantum-computer device, which is also referred to as a 'noisy intermediate-scale quantum computer' [9]. The variational approach can be beneficial as it opens the possibility of discovering algorithms for preparing Gibbs states of systems of interest with much shorter depth. However, as with other quantum circuit optimization/ learning approaches, there is always a significant possibility of the optimizer getting lost in Hilbert space and thus not converging in any reasonable time. Such pitfalls can be avoided by choosing a suitable ansatz or template for the algorithm, thereby restricting the search space and increasing the confidence that the optimizer converges to a circuit that is good enough, if not necessarily optimal.

There are many ansatzae that could be considered in this variational approach. The focus here is on Trotterized adiabatic state preparation, choosing an ansatz that strongly resembles a Trotter series approximation to a state preparation protocol for the eigenstates of the Hamiltonian H from the eigenstates $H_0$ which are trivial to prepare. Specifically, by definition, $$H'(s) = H_0 + sH_1 \tag{63}$$

with $H = H'(1) = H_0 + H_1$ Here $H'(1) = H$ and $H'(0) = H_0$, which means that if $H'(s)$ is gapped for all $s \in [0,1]$ then an adiabatic sweep along a linear adiabatic path from $H'(0)$ to $H'(1)$ will map the eigenstates of $H_0$ to those of $H=H_0+H_1$. The state is taken to be of the form for parameters $\vec{\theta}=[\theta_1, \ldots, \theta_r, p_1, \ldots, p_{D-1}]$ $$|\psi_0(\vec{\theta})\rangle = \prod_{k=0}^{r+1} e^{-iH'((\theta_k+\theta_{k+1})/2)(\theta_{k+1}-\theta_k)T} U(p_1, \ldots, p_{D-1})|0\rangle \quad (64)$$

$$= \prod_{k=1}^{r} e^{-iH'((\theta_k+\theta_{k+1})/2)(\theta_{k+1}-\theta_k)T}$$

$$\sum_{j=1}^{D} \sqrt{p_j} |j\rangle|j\rangle,$$

where $\theta_0=0$ and $\theta_1=1$ and $P_D=1-\Sigma_{j=1}^{D-1} p_j$ by normalization. In other words, the parameters $\theta_1, \ldots, \theta_r$ specify the adiabatic path whereas $p_1, \ldots, p_{D-1}$ are the probabilities of the different eigenstates in the density matrix obtained after tracing out one subsystem.

While the total time of evolution T could additionally be varied over, it is here taken to be fixed in the optimization for simplicity and the fact that T is linearly dependent on the other parameters of the ansatz. This ansatz has one key advantage: if one takes $T \to \infty$ and $r \to \infty$, then all Gibbs states can be prepared in this fashion. That is to say, it is known that a solution exists for the preparation of the true Gibbs state that is of this form. Alternative solutions, which may employ a sub-exponential number of parameters, may also be used. In this example, however the ansatz is chosen because it will be known to converge under the assumption that the gap of the Hamiltonian is bounded.

Numerical Simulations

The validity of the present protocol is now demonstrated by numerically minimizing the free energy for the above ansatz. A penalty term is added to the free energy in the cost function to ensure that the parameters $p_1, \ldots, P_D$ are valid probabilities, i.e., they are between 0 and 1. The variables $\theta_1, \ldots, \theta_r$ were further parameterized as $\theta_1=\tanh \phi_1, \ldots, \theta_r=\tanh \phi_r$, to ensure that the total time of evolution remains bounded. The cost function is numerically minimized using Powell's conjugate direction method, which is a gradient-free numerical optimization algorithm.

For these simulations, the Hamiltonians are restricted to qubit Hamiltonians of of the following form:

$$H_0 = \sum_{j=1}^{n} a_j \sigma_Z^{(j)}, \quad (65)$$

$$H_1 = \sum_{j} b_j \sigma_X^{(j)} + \sum_{j,k} c_{j,k} \sigma_Z^{(j)} \sigma_Z^{(j)}, \quad (66)$$

the goal being to prepare Gibbs states of $H=H_0+H_1$. FIG. 8A and FIG. 8B show the representative progress in numerical optimization for one such Hamiltonian with coefficients of magnitude O(1). An initialization was chosen such that the parameters $p_1, \ldots, p_D$ were random perturbations about the true Gibbs state probabilities, and the path specified by the parameters $\phi_1, \ldots, \phi_r$ was a random perturbation about a linear adiabatic path.

The progress of the optimization is recorded as follows. At fixed intervals (of number of cost function evaluations), the optimizer returns the quantum state at that point and the corresponding free energy. From this data is computed the lowest free energy obtained up to a given a number of function evaluations, and the corresponding quantum state. In FIG. 8A is plotted the difference between this "current best" free energy and that of the true Gibbs state. In FIG. 8B is plotted the trace distance between the state corresponding to the "current best" free energy and the true Gibbs state. The results show that the optimization indeed converges towards the minimum free energy, and that this also implies convergence in trace distance to the true Gibbs state.

Application to Quantum Boltzmann Training

Within the last several years, quantum machine learning has emerged as a significant motivation for developing quantum computers. In theory, quantum computers are naturally poised to model various real-world problems to which classical models are difficult to apply. Relative to the analogous classical model, a quantum model may be more accurate, more private, or faster to train, for example. Significantly, quantum computers may be capable of modeling probability distributions that, when represented by classical models, cannot be sampled efficiently. This ability may provide a broader or richer family of distributions than could be realized using a polynomial-sized classical model.

Many examples in which quantum machine learning may provide such advantages involve data having inherently quantum features, e.g., physical, chemical, and/or biological data. A quantum machine-learning dataset may include inter-atomic energy potentials, molecular atomization energy data, polarization data, molecular orbital eigenvalue data, protein or nucleic-acid folding data, etc. In some examples, quantum machine learning models may be suitable for simulating, evaluating, and/or designing physical quantum systems. For example, quantum machine learning models may be used to predict behavior of nanomaterials (e.g., quantum dot charge states, quantum circuitry, and the like). In some examples, quantum machine learning models may be suitable for tomography and/or partial tomography of quantum systems, e.g., approximately cloning an oracle system represented by an unknown density operator. Numerous other examples are equally envisaged.

Classical data is traditionally fed to a quantum algorithm in the form of a training set, or test set, of vectors. But rather than train on individual vectors, as one does in classical machine learning, quantum machine learning provides an opportunity to train on quantum-state vectors. More specifically, if the classical training set is thought of as a distribution over input vectors, then the analogous quantum training set would be a density operator, denoted $\rho$, which operates on the global quantum state of the network.

The goals in quantum machine learning vary from task to task. For unsupervised generative tasks, a common goal is to find, by experimenting with $\rho$, a process V such that $V:|0\rangle \mapsto \sigma$ such that $\|\rho-\sigma\|$ is small. Such a task corresponds, in quantum information language, to partial tomography or approximate cloning. Alternatively, supervised learning tasks are possible, in which the task is not to replicate the distribution but rather to replicate the conditional probability distributions over a label subspace. This approach is frequently taken in QAOA-based quantum neural networks.

In recent years, quantum Boltzmann machines have emerged as one of the most promising architectures for quantum neural networks. So that the reader can more easily understand the function of the quantum Boltzmann machine, the classical variant of the Boltzmann machine will first be described, with reference to FIG. 9A and FIG. 9B. The skilled reader will understand that some but not all aspects of this description are relevant also to the quantum variant, which is further described hereinafter.

Figure 9B:
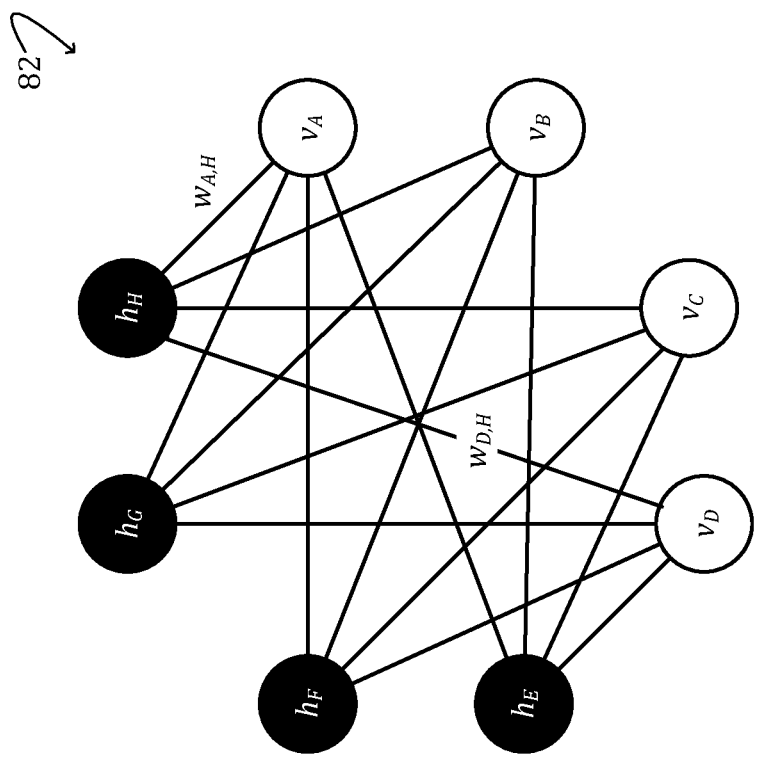
FIG. 9B shows aspects of an example restricted Boltzmann machine.
Figure 9A:
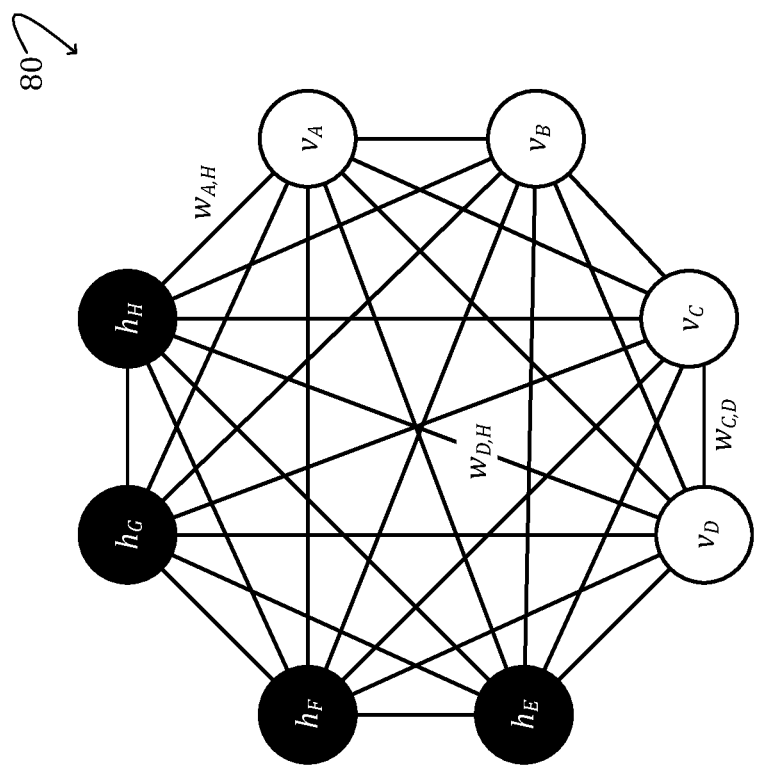
FIG. 9A shows aspects of an example Boltzmann machine.

FIG. 9A shows aspects of a Boltzmann machine 80, in one example. Every Boltzmann machine includes one or more of visible nodes $v_i$ and may also include one or more hidden nodes $h_i$. The term 'unit' may also be used to refer to a node of a Boltzmann machine; these terms are used interchangeably herein. Only the visible nodes receive data from outside the Boltzmann machine. While FIG. 9A shows four visible and four hidden nodes, other combinations of visible and hidden nodes are also envisaged, and certainly the numbers of visible and hidden nodes need not be equal. Each visible node $v_i$ and each hidden node $h_i$ of classical Boltzmann machine 80 is characterized by a state variable $s_i$, which may have a value of 0 or 1. The collective states of the visible and hidden nodes are expressible, therefore, as a binary vectors v and h, respectively.

Collectively, the $\{s_i\}$ determines the global energy E of classical Boltzmann machine 80, according to $$-E = \sum_{i<j} w_{ij} s_i s_j + \sum_i \theta_i s_i, \quad (67)$$

where each $\theta_i$ defines the bias of $s_i$ on the energy, and each $w_{ij}$ defines the weight of an additional energy of interaction, or 'connection strength', between nodes i and j.

During operation of Boltzmann machine 80, the equilibrium state is approached by resetting the state variable $s_i$ of each of a sequence of randomly selected nodes according to a statistical rule. The rule for a classical Boltzmann machine is that the ensemble of nodes adheres to the Boltzmann distribution of statistical mechanics. In other words, $$\Delta E_i = -k_B T \ln \frac{p_{s_i=0}}{p_{s_i=1}}, \quad (68)$$

where $p_{s_i=0}$ and $p_{s_i=1}$ express the probabilities that $s_i=0$ or 1, respectively, where $\Delta E_i$ is the change in the energy E of the ensemble of nodes due to the transition of the single node i from the $s_i=0$ to the $s_i=1$ state, where $k_B$ is a constant, and where T is an adjustable parameter akin to the 'temperature' of the system. The reader will note that $\Delta E_i$ is readily obtained from Eq 4, above. Substituting $p_{s_i=0}=1-p_{s_i=1}$, the logistic function for the classical Boltzmann machine is obtained, $$p_{s_i=1} = \frac{1}{1+e^{-\Delta E_i/T}}. \quad (69)$$

After a sufficient number of iterations at a predetermined T, the probability of observing any global state $\{s_i\}$ will depend only upon the energy of that state, not on the initial state from which the process was started. At that limit, the Boltzmann machine has achieved 'thermal equilibrium' at temperature T. In the optional method of 'simulated annealing', T is gradually transitioned from higher to lower values during the approach to equilibrium, in order to increase the likelihood of descending to a global energy minimum.

In useful examples, a Boltzmann machine is trained to converge to one or more desired global states using an external training distribution over such states. During the training, biases $\theta_i$ and weights $w_{ij}$ are adjusted so that the global states with the highest probabilities have the lowest energies. To illustrate the training method, let $P^+$ (v) be a distribution of training data over the vector of visible nodes v, and let $P^-$ (v) be a distribution of thermally equilibrated states of the Boltzmann machine, which have been 'marginalized' over the hidden nodes of the machine. An appropriate measure of the dissimilarity of the two distributions is the Kullback-Leibler (KL) divergence G, defined as $$G = \sum_v P^+(v) \ln \frac{P^+(v)}{P^-(v)}, \quad (70)$$

where the sum is over all possible states v of v. In practice, a Boltzmann machine may be trained in two alternating phases: a 'positive' phase in which v is constrained to one particular binary state vector sampled from the training set (according to $P^+$ (v)), and a 'negative' phase in which the network is allowed to run freely. In this approach, the gradient with respect to a given weight, $w_{ij}$ is given by $$\frac{\partial G}{\partial w_{ij}} = -\frac{p_{ij}^+ - p_{ij}^-}{R}, \quad (71)$$

where $p_{ij}^+$ is the probability that $s_i=s_j=1$ at thermal equilibrium of the positive phase, $p_{ij}^-$ is the probability that $s_i=s_j=1$ at thermal equilibrium of the negative phase, and where R is a learning-rate parameter. Finally, the biases are trained according to $$\frac{\partial G}{\partial \theta_i} = -\frac{p_i^+ - p_i^-}{R}. \quad (72)$$

An important variant of the Boltzmann machine is the 'restricted' Boltzman machine (RBM). An example RBM 42 is represented in FIG. 9B. An RBM differs from a generic Boltzmann machine in that it has no connection ($w_{ij}=0$) between any pair of hidden nodes or any pair of visible nodes. Relative to the generic classical Boltzmann machine, the classical RBM is more easily trained and is applicable to a 'deep-learning' strategy in which the hidden nodes of a trained, upstream RBM are used to provide training data for training an adjacent downstream RBM, in a stacked, multilayer configuration.

Returning briefly to FIG. 1, quantum computer 10 may be configured to instantiate a quantum-computing analog of the classical Boltzmann machine, which is referred to herein as a quantum Boltzmann machine (QBM). The state $\{s_i\}$ of the visible and hidden nodes of a QBM may be represented in the array of qubits 14 of qubit register 12. For example, the state of four visible nodes of a QBM may be represented in qubits 14A through 14D, and the state of four hidden nodes of the QBM may be represented in qubits 14E through 14H. In other examples, qubit register 12 may include, in addition to qubits corresponding to the visible and hidden nodes, one or more 'ancilla' qubits used to transiently store quantum states derived from the states of the visible and hidden nodes—e.g., to implement an oracle. Naturally, any physical register of two or more qubits is divisible, as well as associable, so as to form any number of logical qubit registers—visible, hidden, and ancilla registers, for example. The skilled reader will understand that a qubit register may be referred to as a 'register' in the description below.

Boltzmann machines are extensible to the quantum domain because they approximate the physics inherent in a quantum computer. In particular, a Boltzmann machine provides an energy for every configuration of a system and generates samples from the distribution of configurations with probabilities that depend exponentially on the energy. The same would be expected of a canonical ensemble in statistical physics. The explicit model in this case is $$\sigma_v = Tr_h\left(\frac{e^{-H}}{Z}\right), \qquad (73)$$

where $Tr_h(\bullet)$ is the partial trace over an auxiliary subsystem known as the hidden subsystem, which serves to build correlations between nodes of the visible subsystem. Thus, the goal of generative quantum Boltzmann training is to choose $\sigma_v = \mathrm{argmin}_H (\mathrm{dist}(\rho, \sigma_v))$ for an appropriate distance, or divergence, function. In this disclosure, the terms 'loss function', 'cost function', and 'divergence function' are used interchangeably.

The goal in training a QBM is to find a Hamiltonian that replicates a given input state as closely as possible. This is useful not only in generative applications, but can also be used for discriminative tasks by defining the visible unit subsystem to be composed of the tensor products of a visible subsystem and an output layer that yields the classification of the system. While generative tasks are the main focus here, it is straightforward to generalize this work to classification.

As noted above, for generative training on classical data, the natural divergence between the input and output distributions is the KL divergence. When the input is a quantum state, however, the quantum relative entropy is an appropriate measure of the divergence:

$$S(\rho|\sigma_v) = Tr(\rho \log \rho) - Tr(\rho \log \sigma_v). \qquad (74)$$

The skilled reader will note that Eq. (74) reduces to the KL divergence if $\rho$ and $\sigma_v$ are classical. Moreover, S becomes zero if and only if $\rho = \sigma_v$.

While quantum relative entropy is generally difficult to compute, the gradient of the quantum relative entropy is readily available for QBMs with all visible units. In such cases, $\sigma_v = e^{-H}/Z$. Further, the relation $\log(e^{-H}/Z) = -H - \log(Z)$ allows straightforward computation of the required matrix derivatives. On the other hand, no methods are known prior to this disclosure for generative training of QBMs using quantum relative entropy as a loss function when hidden units are present. This is because the partial trace in $\log(Tr_h e^{-H}/Z)$ prevents simplification of the logarithm term when computing the gradient.

Figure 10:
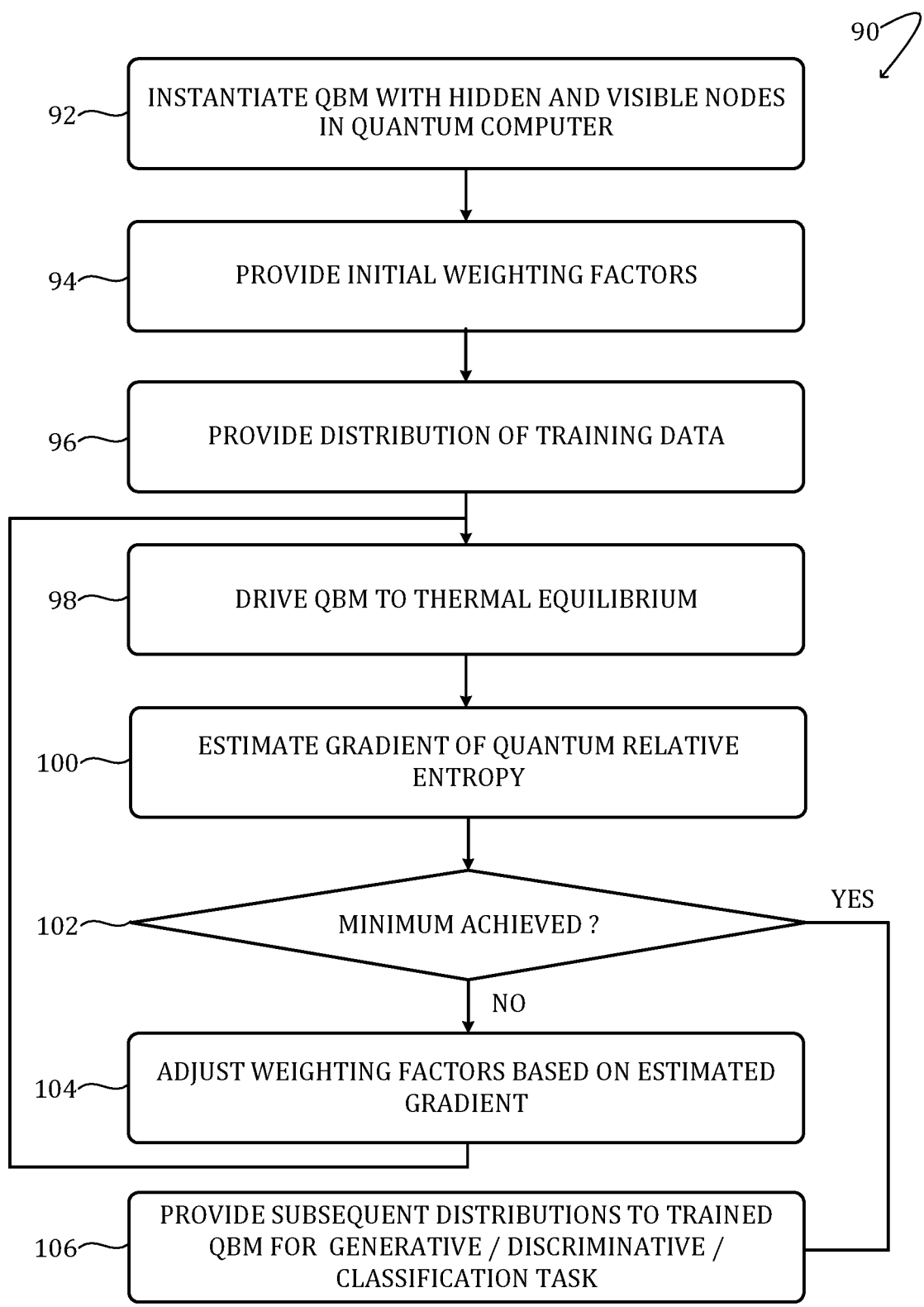
FIG. 10 illustrates an example method to train a quantum Boltzmann machine having visible and hidden nodes.

Returning now to the drawings, FIG. 10 illustrates an example method 90 to train a QBM having one or more visible nodes and one or more hidden nodes. The method uses quantum relative entropy as a cost function and includes estimation of the gradient of the quantum relative entropy.

At 92 of method 90, a QBM having visible and hidden nodes is instantiated in a quantum computer. Here each visible and each hidden node of the QBM is associated with a different corresponding qubit of a plurality of qubits of the quantum computer. As described above, the state of each of the plurality of qubits contributes to the global energy of the QBM according to a set of weighting factors.

At 94 initial values of the weighting factors—e.g., biases $\theta_i$ and weights $w_{ij}$—are provided to the QBM. As noted above, the initial values of the weighting factors may be incorporated into a distribution $\sigma_v$ over the one or more visible nodes of the QBM, for example.

At 96 a predetermined distribution of training data is provided to the visible nodes of the QBM. Generally speaking, training data may be provided so as to span the entire visible subsystem of the QBM, or any subset thereof. For generative applications, for example, the training distribution may cover all of the visible nodes, whereas for some classification tasks, it may be sufficient to compute a training loss function (such as a classification error rate) on a subset of visible nodes designated as the 'output units' or 'output qubits'. Accordingly, the plurality of qubits of the qubit register may include one or more designated output qubits corresponding to one, some, or all of the visible nodes of the QBM, and a distribution of training data is provided over the one or more output qubits.

As noted above, the distribution of training data may take the form of a density operator $\rho$, which represents the quantum state of the visible subsystem as a statistical distribution or mixture of pure quantum states. Accordingly, the density operator may represent a statistically-weighted collection of possible observations of a quantum system, analogous to a probability distribution over classical state vectors. In some examples, a density operator $\rho$ may represent superpositions of different basis states and/or entangled states. Superposition states in quantum data may represent uncertainty and/or ambiguity in the data. Entangled states may represent correlations between states. Accordingly, a density operator $\rho$ may be used to more precisely describe systems in which uncertainty and/or non-trivial correlations occur, relative to any competing classical distribution. In some examples, classical distributions of training data may be converted to an appropriate density operator for use in the methods herein.

At 98 the QBM is driven to thermal equilibrium by repeated resetting of the state of each node and application of a logistic measurement function. At 100 the gradient of the quantum relative entropy between the one or more output qubits and the distribution of training data is estimated with respect to the weighting factors, based on the thermally equilibrated qubit state held in the quantum computer. At 102 it is determined whether a minimum of the quantum relative entropy has been reached with respect to the set of weighting factors. If a minimum has not been reached, then the method advances to 104, where the weighting factors are adjusted (i.e., trained) based on the estimated gradient of the quantum relative entropy, using the quantum relative entropy as a cost function. From here the equilibrium state of the QBM is again approached, now using the adjusted weighting factors. If a minimum in the quantum relative entropy is reached at 102, then the training procedure concludes with the currently adjusted values of the weighting factors accepted as trained values. The trained QBM may now be provided, at 106, subsequent non-training distributions, for generative, discriminative, or classification tasks. In other examples, execution of method 90 may loop back to 96 where an additional training distribution is offered and processed.

Figure 11A:
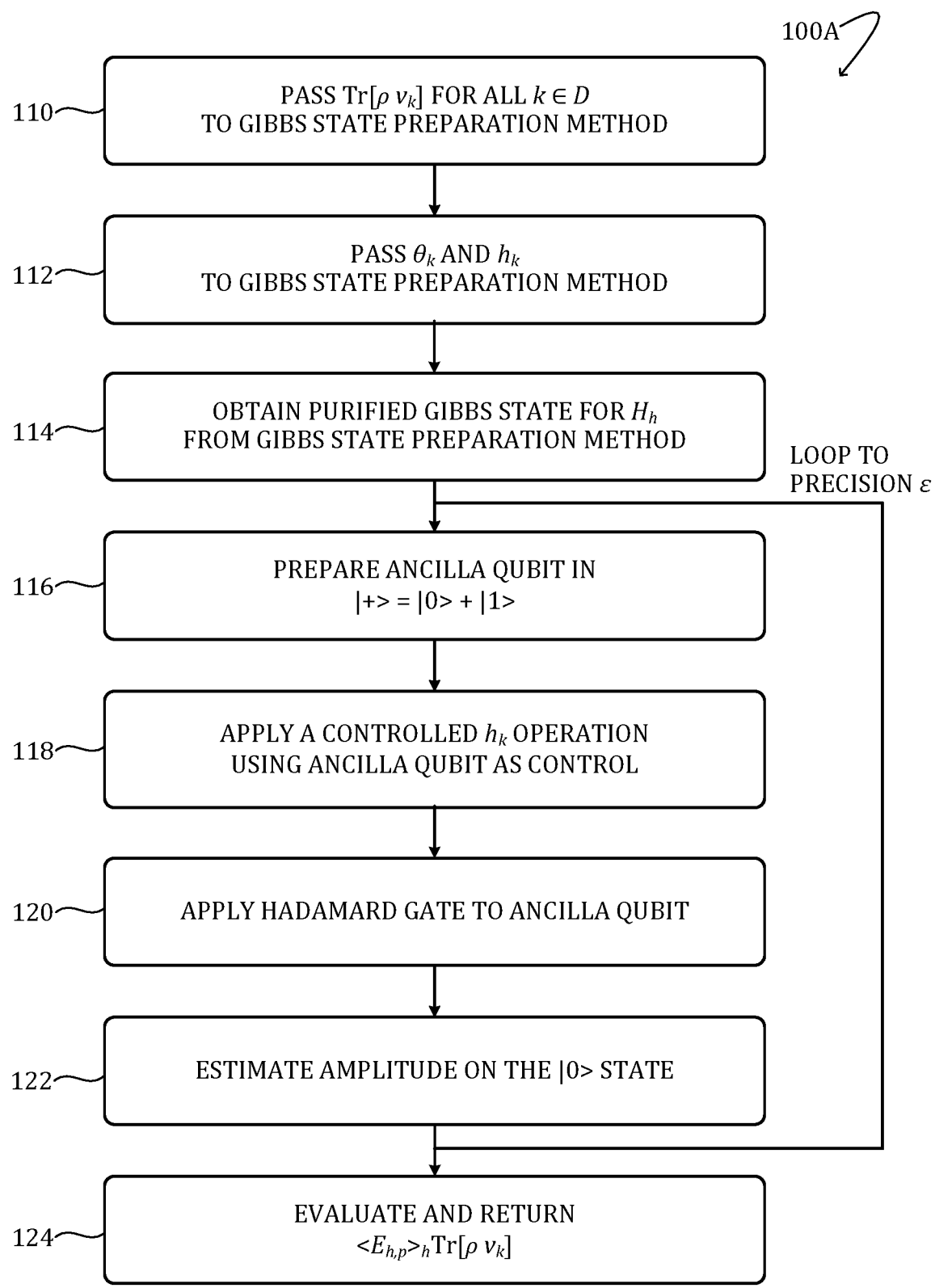
FIG. 11A and FIG. 11B illustrate an example method to estimate the gradient of the quantum relative entropy of a restricted quantum Boltzmann machine.
Figure 11B:
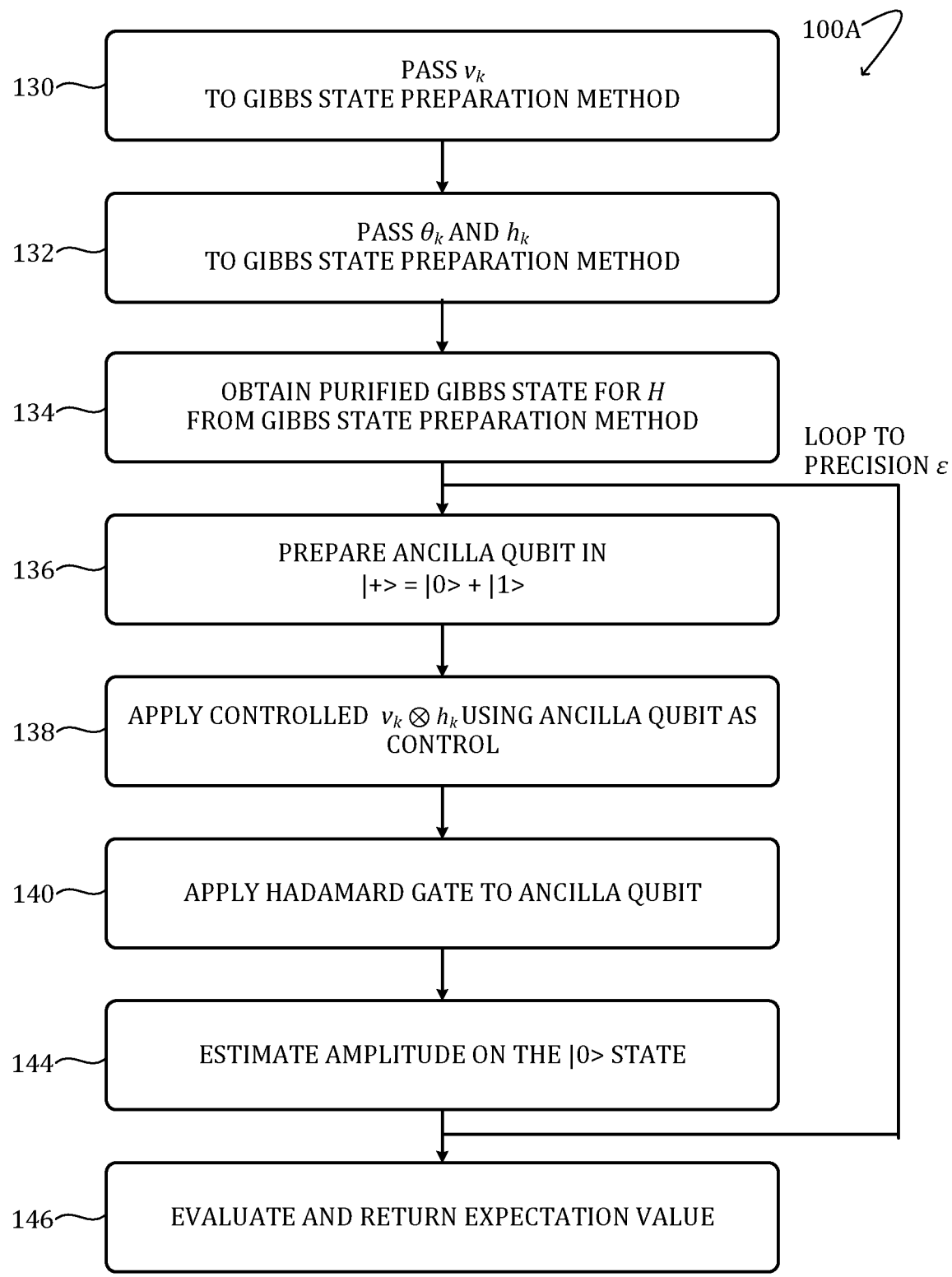

FIG. 11A and FIG. 11B illustrate an example method 100A to estimate the gradient of the quantum relative entropy of a restricted QBM having visible and hidden nodes. In a restricted QBM, the Hamiltonian terms acting on the hidden units mutually commute by definition herein. The estimated gradient may be computed as a difference of two terms, $$\frac{\partial \tilde{S}}{\partial \theta_p} = \mathbb{E}_h[E_{h,p}]Tr[\rho v_p] - Tr\left[\frac{\partial H}{\partial \theta_p}\frac{e^{-H}}{Z}\right]. \quad (75)$$

As evident from Eq. (75), the first term relates to the training distribution and the second term relating to the quantum state of the visible nodes. Accordingly, FIG. 11A illustrates aspects of method 100A related to computation of the first term, while FIG. 11B illustrates aspects of method 100A related to computation of the second term. Method 100A may be employed as a particular instance of step 100 in the training method of FIG. 10.

In method 100A, estimation of the gradient of the quantum relative entropy of a QBM includes computing a variational upper bound on the quantum relative entropy, according to the following algorithm. Beginning in FIG. 11A, at 110 of method 100A, the trace $Tr[\rho v_k]$ computed for all $k \in D$ is passed to a Gibbs-state preparation method (vide supra). At 112, biases $\theta_k$ and operator $h_k$ are also passed to the Gibbs-state preparation method. At 114 the Gibbs-state preparation method is executed, resulting in population of the plurality of qubits of the quantum computer with a purified Gibbs state for Hamiltonians $H_h$. In this method, estimating the gradient includes using substantially commuting operators (i.e., having a commutator which is small or negligible in comparison to each operator) to assign an energy penalty to each qubit corresponding to a hidden node of the QBM.

At 116 of method 100A, a control loop is encountered wherein an ancilla qubit is prepared in the state $|+\rangle = |0\rangle + |1\rangle$. At 118 a controlled $h_k$ operation is performed, using the ancilla qubit prepared at 116 as a control. At 120 a Hadamard gate is applied to the ancilla qubit. Then, at 122, the amplitude of the ancilla qubit state is estimated on the $|0\rangle$ state. At this point in the method, the confidence analysis described above is applied in order to determine whether additional measurements are required to achieve precision $\epsilon$. If so, execution returns to 116. Otherwise, the product $\langle E_{h,p}\rangle_h Tr[\rho v_k]$ of the expectation value and the trace is evaluated and returned at 124.

Turning now to FIG. 11B, at 130 of method 100A, the visible state $v_k$ is passed to the Gibbs-state preparation method. At 132, biases $\theta_k$ and operator $h_k$ are also passed to the Gibbs-state preparation method. At 134 the Gibbs-state preparation method is executed, thereby populating the plurality of qubits of the quantum computer with a purified Gibbs state for Hamiltonian H.

At 136 of method 100A, a control loop is encountered wherein an ancilla qubit is prepared in the state $|+\rangle = |0\rangle + |1\rangle$. At 138, a controlled $v_k \otimes h_k$ operation is applied, using the ancilla qubit as a control, prior to application at 140 of a Hadamard gate on the ancilla qubit. Then, at 144, the amplitude of the ancilla qubit state is estimated on the $|0\rangle$ state. At this point in the method, the confidence analysis described above is applied in order to determine whether additional measurements are required to achieve precision $\epsilon$. If so, execution returns to 136. Otherwise, the resulting expectation value is evaluated and returned at 146.

Additional aspects of the methods of FIGS. 10, 11A, and 11B are described in U.S. patent application Ser. No. 16/289, 417, which is hereby incorporated herein by reference, for all purposes.

Gibbs state preparation remains an indispensable tool in quantum simulation and quantum machine learning. While methods are known for preparing Gibbs states accurately on fault-tolerant quantum computers, existing approaches require complicated control structures or use heuristic methods derived from quantum thermodynamics. By contrast, this disclosure presents a linear combination of unitaries-based approach, which can be implemented semi-classically to approximate the free energy. Since the Gibbs state minimizes free energy, minimizing it is a natural target for such state preparation. This disclosure shows that high-temperature Gibbs states can be efficiently prepared using this approach, and importantly, this approach allows the user to take advantage of prior knowledge about the form of the Gibbs state through a clever use of a variational ansatz.

The method is further shown to learn, albeit slowly, the Gibbs state for a five qubit system. This work demonstrates that the approach given here is likely to be viable on present day hardware. Accordingly, future work based on the present methods could include training of quantum Boltzmann machines that do not require quantum-annealing hardware.

Beyond these results, a number of important, related problems remain open. While this disclosure shows that, in principle, minimizing the free energy is a valid objective function, if one wishes to minimize a statistical difference between the output state and the ideal Gibbs distribution, then, formally speaking, it is not necessarily true that minimizing the free energy will minimize the distance, if local optima are present in the landscape. To address this issue as well as optimize the present approach, state-of-the-art optimizers and ansatzae may be employed that are more appropriate for the problem than the Trotterized adiabatic state preparation disclosed herein. Finding such improved methods may provide an even more practical understanding of how to train quantum Boltzmann machines that can be realized in hardware.

[1] David Poulin and Pawel Wocjan. Sampling from the thermal quantum gibbs state and evaluating partition functions with a quantum computer. *Physical review letters*, 103(22):220502, 2009.

[2] Man-Hong Yung and Alan Aspuru-Guzik. A quantum-quantum metropolis algorithm. Proceedings of the National Academy of Sciences, 109(3):754-759, 2012.

[3] J. van Apeldoorn, A. Gilyén, S. Gribling, and R. de Wolf. Quantum sdp-solvers: Better upper and lower bounds. 58th *IEEE Symposium on Foundations of Computer Science*, pages 403-414, 2017.

[4] R. L. Graham, D. E. Knuth, O. Patashnik, and S. Liu. Concrete mathematics: a foundation for computer science. *Computers in Physics*, 3(5):106-107, 1989.

[5] G. Hao Low and I. L. Chuang. Hamiltonian Simulation by Qubitization. *ArXiv e-prints*, October 2016.

[6] E. Knill, G. Ortiz, and R. D. Somma. Optimal quantum measurements of expectation values of observables. *Phys. Rev. A*, 75(1):012328, January 2007.

[7] Michele Mosca Gilles Brassard, Peter Hoyer and Alain Tapp. Quantum amplitude amplification and estimation. *Quantum Computation and Quantum Information AMS Contemporary Mathematics*, 305:53-74, 2002.

[8] Stephen Boyd and Lieven Vandenberghe. *Convex optimization*. Cambridge university press, 2004.

[9] John Preskill. Quantum computing in the nisq era and beyond. *Quantum* 2, (79), 2018.

To further summarize, one aspect of this disclosure is directed to a method for preparing a Gibbs state in a qubit register of a quantum computer configured to implement one or more quantum gates. The method comprises: applying the one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state; evaluating the Gibbs free energy of the trial quantum state; adjusting the parameters $\vec{\theta}$; re-applying the one or more quantum gates to the one or more qubits to refine the trial quantum state according to the parameters $\vec{\theta}$ as adjusted; and re-evaluating the Gibbs free energy of the trial quantum state.

In some implementations, said adjusting, re-applying, and re-evaluating are repeated iteratively so as to lower the Gibbs free energy of the trial quantum state. In some implementations, the method further comprises computing a change in the Gibbs free energy pursuant to re-evaluating the Gibbs free energy of the trial quantum state; and returning the trial quantum state as the Gibbs state if the change is below a predetermined threshold. In some implementations, the method further comprises computing a gradient of the Gibbs free energy with respect to the parameters $\vec{\theta}$, based on the Gibbs free energy as re-evaluated, wherein adjusting the parameters includes adjusting based on the gradient. In some implementations, adjusting the parameters includes adjusting without estimation of a gradient of the Gibbs free energy with respect to the parameters $\vec{\theta}$. In some implementations, the quantum computer is one or more of a fault-tolerant quantum computer and a near-term quantum-computer device. In some implementations, the Gibbs free energy is defined as a difference $Tr[\sigma(\vec{\theta})H]-kTTr[\sigma(\vec{\theta})\log \sigma(\vec{\theta})]$ of energy and entropy terms, wherein operator H is a fixed Hamiltonian operator, distribution $\sigma$ is a function of the parameters $\vec{\theta}$, T is temperature, k is the Boltzmann constant, Tr represents a trace, and log represents a natural logarithm. In some implementations, evaluating and re-evaluating the Gibbs free energy includes expanding an entropy term $Tr[\sigma(\vec{\theta})\log \sigma(\vec{\theta})]$ as a Fourier series, according to $Tr[\rho \log \rho] \approx \Sigma_m c_m^{(1)} Tr[\rho \cos(j\rho)] + \Sigma_m c_m^{(2)} Tr[\rho \sin(j\rho)]$. In some implementations, expanding the entropy term $Tr[\sigma(\vec{\theta})\log \sigma(\vec{\theta})]$ as a Fourier series includes approximating the logarithm by a truncated Taylor series and converting the truncated Taylor series into a Fourier series. In some implementations, expanding the entropy term $Tr[\sigma(\vec{\theta})\log \sigma(\vec{\theta})]$ as a Fourier series includes computing the Fourier coefficients in a non-quantum computer coupled operatively to the quantum computer. In some implementations, expanding the entropy term $Tr[\sigma(\vec{\theta})\log \sigma(\vec{\theta})]$ as a Fourier series includes applying the one or more quantum gates to the one or more qubits to evaluate Fourier components of the Fourier series. In some implementations, expanding the entropy term $Tr[\sigma(\vec{\theta})\log \sigma(\vec{\theta})]$ as a Fourier series includes applying the one or more quantum gates to the one or more qubits to exponentiate a density matrix. In some implementations, evaluating and re-evaluating the Gibbs free energy includes estimating an energy term. In some implementations, estimating the energy term includes applying a Hadamard test and expanding the Hamiltonian operator as a linear combination of unitary operations. In some implementations, the trial quantum state as selected is a purified density matrix. In some implementations, the trial quantum state as selected is a Trotterized adiabatic state.

Another aspect of this disclosure is directed to a quantum computer comprising: a register including a plurality of qubits; a modulator configured to implement one or more quantum-logic operations on the plurality of qubits; a demodulator configured to output data based on a quantum state of the plurality of qubits; a controller operatively coupled to the modulator and to the demodulator; and computer memory holding instructions that cause the controller to: apply the one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state, evaluate the Gibbs free energy of the trial quantum state, adjust the parameters $\vec{\theta}$, re-apply the one or more quantum gates to the one or more qubits to refine the trial quantum state according to the parameters $\vec{\theta}$ as adjusted, and re-evaluate the Gibbs free energy of the trial quantum state.

In some implementations, the instructions cause the controller to iteratively repeat adjustment of the parameters, re-application of the one or more quantum gates to the one or more qubits to refine the trial quantum state, and re-evaluation of the Gibbs free energy of the trial quantum state so as to lower the Gibbs free energy of the trial quantum state. Here, the method further comprises computing a change in the Gibbs free energy pursuant to re-evaluating the Gibbs free energy of the trial quantum state; and returning the trial quantum state as the Gibbs state if the change is below a predetermined threshold.

Another aspect of this disclosure is directed to a method for preparing a Gibbs state in a qubit register of a quantum computer configured to implement one or more quantum gates. The method comprises: applying the one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state; evaluating the Gibbs free energy of the trial quantum state; adjusting the parameters $\vec{\theta}$; re-applying the one or more quantum gates to the one or more qubits to refine the trial quantum state according to the parameters $\vec{\theta}$ as adjusted; and re-evaluating the Gibbs free energy of the trial quantum state. Here, the Gibbs free energy is defined as a difference of energy and entropy terms. Evaluating and re-evaluating the Gibbs free energy includes expanding the entropy term as a Fourier series and applying the one or more quantum gates to the one or more qubits to evaluate Fourier components of the Fourier series.

In some implementations, expanding the entropy term as a Fourier series includes applying the one or more quantum gates to the one or more qubits to exponentiate a density matrix.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for preparing a Gibbs state in a qubit register of a quantum computer configured to implement one or more quantum gates, the method comprising:
applying the one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state;
evaluating the Gibbs free energy of the trial quantum state, including expanding an entropy term $\text{Tr}[\sigma(\vec{\theta})\log \sigma(\vec{\theta})]$ as a Fourier series, according to $\text{Tr}[\rho\log\rho] \approx \Sigma_m c_m^{(1)} \text{Tr}[\rho\cos(j\rho)] + \Sigma_m c_m^{(2)} \text{Tr}[\rho\sin(j\rho)]$, where Tr is a trace operator, $\rho$ is a distribution, $\rho$ is a density matrix, $c_m^{(1)}$ and $c_m^{(2)}$ are Fourier coefficients, and j is an integer;
adjusting the parameter $\vec{\theta}$;
re-applying the one or more quantum gates to the one or more qubits to refine the trial quantum state according to the parameters $\vec{\theta}$ as adjusted; and
re-evaluating the Gibbs free energy of the trial quantum state as refined,
wherein said adjusting, re-applying, and re-evaluating are repeated iteratively so as to lower the Gibbs free energy of the trial quantum state, thereby forming the Gibbs state in the qubit register.

2. The method of claim 1 further comprising: computing a change in the Gibbs free energy pursuant to re-evaluating the Gibbs free energy of the trial quantum state as refined; and returning that trial quantum state as the Gibbs state if the change is below a predetermined threshold.

3. The method of claim 1 further comprising computing a gradient of the Gibbs free energy with respect to the parameters $\vec{\theta}$, based on the Gibbs free energy as re-evaluated, wherein adjusting the parameters includes adjusting based on the gradient.

4. The method of claim 1 wherein adjusting the parameters includes adjusting without estimation of a gradient of the Gibbs free energy with respect to the parameters $\vec{\theta}$.

5. The method of claim 1 wherein the quantum computer is one or more of a fault-tolerant quantum computer and a near-term quantum-computer device.

6. The method of claim 1 wherein the Gibbs free energy is defined as a difference $\text{Tr}[\sigma(\vec{\theta})H] - kT\text{Tr}[\sigma(\vec{\theta})\log \sigma(\vec{\theta})]$ of energy and entropy terms, wherein operator H is a fixed Hamiltonian operator, distribution $\sigma$ is a function of the parameters $\vec{\theta}$, T is temperature, k is the Boltzmann constant, Tr represents a trace, and log represents a natural logarithm.

7. The method of claim 1 wherein expanding the entropy term $\text{Tr}[\sigma(\vec{\theta})\log \sigma(\vec{\theta})]$ as a Fourier series includes approximating the logarithm by a truncated Taylor series and converting the truncated Taylor series into a Fourier series.

8. The method of claim 1 wherein expanding the entropy term $\text{Tr}[\sigma(\vec{\theta})\log \sigma(\vec{\theta})]$ as a Fourier series includes computing the Fourier coefficients in a non-quantum computer coupled operatively to the quantum computer.

9. The method of claim 1 wherein expanding the entropy term $\text{Tr}[\sigma(\vec{\theta})\log \sigma(\vec{\theta})]$ as a Fourier series includes applying the one or more quantum gates to the one or more qubits to evaluate Fourier components of the Fourier series.

10. The method of claim 1 wherein expanding the entropy term $\text{Tr}[\sigma(\vec{\theta})\log \sigma(\vec{\theta})]$ as a Fourier series includes applying the one or more quantum gates to the one or more qubits to exponentiate a density matrix.

11. The method of claim 1 wherein evaluating and re-evaluating the Gibbs free energy includes estimating an energy term.

12. The method of claim 11 wherein estimating the energy term includes applying a Hadamard test and expanding the Hamiltonian operator as a linear combination of unitary operations.

13. The method of claim 1 wherein the trial quantum state as selected is a purified density matrix.

14. The method of claim 1 wherein the trial quantum state as selected is a Trotterized adiabatic state.

15. A quantum computer comprising:
a register including a plurality of qubits;
a modulator configured to implement one or more quantum-logic operations on the plurality of qubits;
a demodulator configured to output data based on a quantum state of the plurality of qubits;
a controller operatively coupled to the modulator and to the demodulator; and
computer memory holding instructions that cause the controller to:
apply the one or more quantum gates to one or more qubits of the qubit register to prepare a trial quantum state spanning the one or more qubits, the trial quantum state being defined as a function of parameters $\vec{\theta}$ and being selected to provide an initial estimate of a Gibbs state,
evaluate the Gibbs free energy of the trial quantum state, including expanding an entropy term $\text{Tr}[\sigma(\vec{\theta})\log \sigma(\vec{\theta})]$ as a Fourier series, according to $\text{Tr}[\rho\log \rho \approx \Sigma_m c_m^{(1)} \text{Tr}[\rho\cos(j\rho)] + \Sigma_m c_m^{(2)} \text{Tr}[\rho\sin(j\rho)]$, where Tr is a trace operator, $\rho$ is a distribution, $\rho$ is a density matrix, $c_m^{(1)}$ and $c_m^{(2)}$ are Fourier coefficients, and j is an integer;
adjust the parameters $\vec{\theta}$;
re-apply the one or more quantum gates to the one or more qubits to refine the trial quantum state according to the parameters $\vec{\theta}$ as adjusted; and
re-evaluate the Gibbs free energy of the trial quantum state as refined,
wherein said adjusting, re-applying, and re-evaluating are repeated iteratively so as to lower the Gibbs free energy of the trial quantum state, thereby forming the Gibbs state in the qubit register.

16. The quantum computer of claim 15 wherein the instructions cause the controller to iteratively repeat adjustment of the parameters, re-application of the one or mor quantum gates to the one or more qubits to refine the trial quantum state, and re-evaluation of the Gibbs free energy of the trial quantum state so as to lower the Gibbs free energy of the trial quantum state, the method further comprising:
computing a change in the Gibbs free energy pursuant to re-evaluating the Gibbs free energy of the trial quantum state; and returning the trial quantum state as the Gibbs state if the change is below a predetermined threshold.

17. A method for preparing a Gibbs state in a qubit register of a quantum computer configured to implement one or more quantum gates, the method comprising:
applying the one or more quantum gates to one or more qubits of the qubit register to prepare a trial quantum state spanning the one or more qubits, the trial quantum state being defined as a function of parameters $\vec{\theta}$ and being selected to provide an initial estimate of the Gibbs state;
evaluating the Gibbs free energy of the trial quantum state;
adjusting the parameters $\vec{\theta}$;
re-applying the one or more quantum gates to the one or more qubits to refine the trial quantum state according to the parameters $\vec{\theta}$ as adjusted; and
re-evaluating the Gibbs free energy of the trial quantum state, as refined,
wherein said adjusting, re-applying, and re-evaluating are repeated iteratively so as to lower the Gibbs free energy of the trial quantum state, thereby forming the Gibbs state in the qubit register.
wherein the Gibbs free energy is defined as a difference of energy and entropy terms, and wherein evaluating and re-evaluating the Gibbs free energy includes:
expanding the entropy term $\text{Tr}[\sigma(\vec{\theta})\log\sigma(\vec{\theta})]$ as a Fourier series, according to $\text{Tr}[\rho\log\rho] \approx \Sigma_m c_m^{(1)} \text{Tr}[\rho\cos(j\rho)] + \Sigma_m c_m^{(2)} \text{Tr}[\rho\sin(j\rho)]$, where Tr is a trace operator, $\rho$ is a distribution, $\rho$ is a density matrix, $c_m^{(1)}$ and $c_m^{(2)}$ are Fourier coefficients, and j is an integer, and
applying the one or more quantum gates to the one or more qubits to evaluate Fourier components of the Fourier series.

18. The method of claim 17 wherein expanding the entropy term as a Fourier series includes applying the one or more quantum gates to the one or more qubits to exponentiate a density matrix.

* * * * *